US010131780B2

(12) United States Patent
Yagi et al.

(10) Patent No.: US 10,131,780 B2
(45) Date of Patent: Nov. 20, 2018

(54) THERMOPLASTIC ELASTOMER COMPOSITION, STOPPER FOR MEDICAL CONTAINER, AND MEDICAL CONTAINER

(71) Applicant: Asahi Kasei Kabushiki Kaisha, Tokyo (JP)

(72) Inventors: Noriko Yagi, Tokyo (JP); Mika Horiuchi, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 78 days.

(21) Appl. No.: 15/304,036

(22) PCT Filed: Apr. 15, 2015

(86) PCT No.: PCT/JP2015/061559
§ 371 (c)(1),
(2) Date: Oct. 13, 2016

(87) PCT Pub. No.: WO2015/159912
PCT Pub. Date: Oct. 22, 2015

(65) Prior Publication Data
US 2017/0029614 A1    Feb. 2, 2017

(30) Foreign Application Priority Data

Apr. 16, 2014  (JP) ................................ 2014-084722
Apr. 16, 2014  (JP) ................................ 2014-084726
Oct. 17, 2014  (JP) ................................ 2014-212323
Oct. 17, 2014  (JP) ................................ 2014-212324

(51) Int. Cl.
| | |
|---|---|
| C08L 53/02 | (2006.01) |
| C08L 71/12 | (2006.01) |
| C08L 23/12 | (2006.01) |
| C08L 91/00 | (2006.01) |
| C08J 3/24 | (2006.01) |
| A61J 1/14 | (2006.01) |

(52) U.S. Cl.
CPC ............... *C08L 53/025* (2013.01); *C08J 3/24* (2013.01); *C08L 71/12* (2013.01); *C08L 91/00* (2013.01); *A61J 1/1406* (2013.01); *C08L 2205/025* (2013.01); *C08L 2205/03* (2013.01); *C08L 2205/035* (2013.01); *C08L 2205/06* (2013.01); *C08L 2207/04* (2013.01)

(58) Field of Classification Search
CPC ........ C08L 23/10; C08L 71/12; C08L 53/025; C08L 53/02; C08L 23/12; C08L 2205/025; C08L 2205/03; C08L 2205/035
See application file for complete search history.

(56) References Cited

U.S. PATENT DOCUMENTS

| | | | | |
|---|---|---|---|---|
| 4,291,139 | A * | 9/1981 | Halasa ................ | C08F 297/044 |
| | | | | 524/505 |
| 4,772,657 | A | 9/1988 | Akiyama et al. | |
| 2006/0106165 | A1* | 5/2006 | Fujisawa ................ | C08L 25/06 |
| | | | | 525/88 |
| 2012/0037396 | A1 | 2/2012 | Gu | |
| 2013/0116648 | A1 | 5/2013 | Muto | |

FOREIGN PATENT DOCUMENTS

| | | |
|---|---|---|
| JP | S62-048758 A | 3/1987 |
| JP | S63-057663 A | 3/1988 |
| JP | S63-101446 A | 5/1988 |
| JP | H02-209943 A | 8/1990 |
| JP | H05-202267 A | 8/1993 |
| JP | H06-057130 A | 3/1994 |
| JP | H07-100184 A | 4/1995 |
| JP | H07-275345 A | 10/1995 |
| JP | 2003-082189 A | 3/2003 |
| JP | 2012-025944 A | 2/2012 |
| JP | 2012-057162 A | 3/2012 |
| JP | 2012-525477 A | 10/2012 |
| TW | 201020289 A | 6/2010 |
| WO | 2011/043231 A1 | 4/2011 |

OTHER PUBLICATIONS

Sano et al., electronic translation of WO 2011/043231, Apr. 2011.*
Interational Search Report issued in corresponding International Patent Application No. PCT/JP2015/061559 dated Jul. 14, 2015.
Supplementary European Search Report issued in counterpart European Patent Application No. 15779576.6 dated Mar. 3, 2017.

* cited by examiner

*Primary Examiner* — Jeffrey C Mullis

(74) *Attorney, Agent, or Firm* — Morgan, Lewis & Bockius LLP

(57) ABSTRACT

This thermoplastic elastomer composition comprises: 100 parts by mass of a hydrogenated block copolymer (a); from 3 to 50 parts by mass of a polypropylene-based resin (b), from 5 to 100 parts by mass of a polyphenylene ether resin (c), and from 50 to 200 parts by mass of a non-aromatic softener (d), the hydrogenated block copolymer (a) is able to be formed by hydrogenating a block copolymer that comprises at least one polymer block A comprising a vinyl aromatic hydrocarbon compound monomer unit as a primary component and at least one polymer block B comprising a conjugated diene compound monomer unit as a primary component, and a weight average molecular weight of the hydrogenated block copolymer (a) is from 100,000 to 350,000.

19 Claims, No Drawings

10,131,780 B2

THERMOPLASTIC ELASTOMER COMPOSITION, STOPPER FOR MEDICAL CONTAINER, AND MEDICAL CONTAINER

TECHNICAL FIELD

The present invention relates to a thermoplastic elastomer composition, a stopper for a medical container, and a medical container.

BACKGROUND ART

Depending on the manner in which a medical container, such as an infusion solution bag, is used, liquid may remain in the container even after use. In cases where liquid remains in a medical container in this way, there are concerns that if a medical injection needle is removed from a stopper attached to the container, then liquid remaining in the container will leak out or spill. Therefore, stoppers for medical containers need to be resealable and have a liquid leakage-resistance.

Isoprene rubbers, butadiene rubbers, butyl rubbers and blends thereof are used for stoppers for medical containers from the perspectives of resealability and liquid leakage resistance. However, in cases where the rubbers mentioned above are used, it is necessary to carry out at least a step of adding an additive such as a filler, softener or vulcanizing agent and then kneading or a vulcanization step of supplying a kneaded rubber mixture to a mold for a stopper, and then heating and pressurizing. However, these steps are complex and require large-scale equipment, and therefore involve problems such as high production costs.

In addition, medical container stoppers of rubber mentioned above may cause a problem of degradation caused by double bonds in rubber components during storage, and degraded rubber components may transfer into liquid medicines.

Plastic needles replace conventional metal injection needles for reasons such as handlability and safety. Because plastic needles are less rigid than metal needles, the needle diameter must be greater in order to ensure needle rigidity. However, if the needle diameter increases, resistance (needlestick resistance) increases in piercing into a stopper for a medical container.

Stoppers made of thermoplastic elastomers have been proposed in recent years in order to solve the problems mentioned above. For example, Patent Document 1 discloses a stopper for medical use comprising a medical resin composition, which comprises a hydrogenated block copolymer, a hydrogenated petroleum resin, a poly phenylene ether resin, a peroxide decomposition type olefinic resin and a non-aromatic type rubber softener. In addition, Patent Document 2 discloses a rubber stopper for medical use, which is obtained by molding a resin composition that comprises a hydrogenated block copolymer, a softener for hydrocarbon-based rubbers, and a polyolefin-based resin.

CITATION LIST

Patent Document

Patent Document 1: Japanese Patent Laid-Open Publication No. 2012-57162
Patent Document 2: Japanese Patent Laid-Open Publication No. 2012-25944

SUMMARY

Technical Problem

However, the stopper for medical use disclosed in Patent Document 1 was made under the assumption that a needle pierces the stopper for only a short period of time, and thus it suffers from problem of not being able to achieve satisfactory liquid leakage resistance upon removing the needle from the stopper after a long period of time. The rubber stopper for medical use disclosed in Patent Document 2 is also unsatisfactory in terms of liquid leakage resistance in cases where a needle pierces in the stopper for a long period of time.

Because medical container stoppers obtained using thermoplastic elastomers such as those mentioned above are unsatisfactory in terms of liquid leakage resistance, the stoppers need to be thick, but if the thickness of a stopper increases, the needlestick resistance further increases, thereby causing a problem such as a injection needle not piercing the stopper well.

Increasing softness of the stopper so as to reduce needlestick resistance leads to problems that the needle will fall out from the stopper during use and that the needle holding force (needle retention properties) will decrease. Therefore, it is important to keep a good balance between needlestick resistance, liquid leakage resistance and needle retention properties.

In view of the above-mentioned problems of the prior art, the objective of the present invention is to provide a thermoplastic elastomer composition having particularly excellent needlestick resistance and liquid leakage resistance, a stopper for a medical container, and a medical container.

Solution to Problem

As a result of diligent research into how to solve the problems mentioned above, the present inventors found that the problems mentioned above can be solved by a thermoplastic elastomer composition that comprises a specific hydrogenated block copolymer, a polyphenylene ether resin, a polypropylene-based resin and a non-aromatic softener in specific proportions, and thereby completed the present invention.

That is, the present invention is as follows:
[1] A thermoplastic elastomer composition comprising:
from 100 parts by mass of a hydrogenated block copolymer (a);
from 3 to 50 parts by mass of a polypropylene-based resin (b),
from 5 to 100 parts by mass of a polyphenylene ether resin (c), and
from 50 to 200 parts by mass of a non-aromatic softener (d), wherein
the hydrogenated block copolymer (a) is a hydrogenated block copolymer (a-1) that is able to be formed by hydrogenating a block copolymer that comprises at least one polymer block A1 comprising a vinyl aromatic hydrocarbon compound monomer unit as a primary component and at least one polymer block B1 comprising a conjugated diene compound monomer unit as a primary component, and
a weight average molecular weight of the hydrogenated block copolymer (a-1) is from 100,000 to 350,000.
[2] A thermoplastic elastomer composition comprising:
from 100 parts by mass of a hydrogenated block copolymer (a);

from 3 to 50 parts by mass of a polypropylene-based resin (b), from 5 to 100 parts by mass of a polyphenylene ether resin (c), and from 50 to 200 parts by mass of a non-aromatic softener (d), wherein the hydrogenated block copolymer (a) comprises:

a hydrogenated block copolymer (a-1') that is able to be formed by hydrogenating a block copolymer that comprises at least one polymer block A1 comprising a vinyl aromatic hydrocarbon compound monomer unit as a primary component and at least one polymer block B1 comprising a conjugated diene compound monomer unit as a primary component; and a hydrogenated block copolymer (a-2) that is able to be formed by hydrogenating a block copolymer that comprises at least one polymer block A2 comprising a vinyl aromatic hydrocarbon compound monomer unit as a primary component and at least one polymer block B2 comprising a conjugated diene compound monomer unit as a primary component, a weight average molecular weight of the hydrogenated block copolymer (a-1') is from 140,000 to 350,000, a weight average molecular weight of the hydrogenated block copolymer (a-2) is from 50,000 to 120,000, and a mass ratio ((a-1')/(a-2)) of the hydrogenated block copolymer (a-1') and the hydrogenated block copolymer (a-2) is from 70/30 to 95/5.

[3] The thermoplastic elastomer composition according to [2], wherein a total content of vinyl aromatic hydrocarbon compound monomer units in the hydrogenated block copolymer (a-2) is from 10 to 25 mass %.

[4] The thermoplastic elastomer composition according to [2] or [3], wherein a vinyl bond content before hydrogenation in the conjugated diene compound monomer units in the hydrogenated block copolymer (a-2) is from 40 to 60 mol. %.

[5] The thermoplastic elastomer composition according to any one of [2] to [4], wherein heat of crystal fusion (ΔH) of the hydrogenated block copolymer (a-2) is less than 0.5 J/g.

[6] The thermoplastic elastomer composition according to any one of [1] to [5], wherein a total content of vinyl aromatic hydrocarbon compound monomer units in the hydrogenated block copolymer (a-1) or (a-1') is from 26 to 70 mass %.

[7] The thermoplastic elastomer composition according to any one of [1] to [6], wherein a vinyl bond content before hydrogenation in the conjugated diene compound monomer units in the hydrogenated block copolymer (a-1) or (a-1') is from 30 to 60 mol. %.

[8] The thermoplastic elastomer composition according to any one of [1] to [7], wherein the hydrogenated block copolymer (a-1) or (a-1') has at least two polymer blocks A1 and at least two polymer blocks B1, and at least one of the polymer blocks B1 is located at a polymer end and a content of said polymer block B1 located at a polymer end is from 0.5 to 9 mass %.

[9] The thermoplastic elastomer composition according to any one of [1] to [8], wherein a reduced viscosity of the polyphenylene ether resin (c) is from 0.15 to 0.70 dL/g.

[10] The thermoplastic elastomer composition according to any one of [1] to [9], wherein the non-aromatic softener (d) is a non-aromatic softener (d-1) having a kinematic viscosity at 40° C. of from 300 to 400 $mm^2$/sec.

[11] The thermoplastic elastomer composition according to any one of [1] to [9], wherein the non-aromatic softener (d) is a non-aromatic softener (d-2) having a kinematic viscosity at 40° C. of 100 $mm^2$/sec or less.

[12] The thermoplastic elastomer composition according to any one of [1] to [9], wherein the non-aromatic softener (d) is a mixture of a non-aromatic softener (d-1) having a kinematic viscosity at 40° C. of from 300 to 400 $mm^2$/sec and a non-aromatic softener (d-2) having a kinematic viscosity at 40° C. of 100 $mm^2$/sec or less, the mass ratio ((d-1)/(d-2)) of the non-aromatic softener (d-1) and the non-aromatic softener (d-2) is from 30/70 to 60/40, and a total content of the non-aromatic softener (d-1) and the non-aromatic softener (d-2) is from 100 to 200 parts by mass relative to 100 parts by mass of the hydrogenated block copolymer (a).

[13] The thermoplastic elastomer composition according to any one of [1] to [12], wherein a number average molecular weight Mn(A1') of a block chain of a polymer block A1' that has the greatest number average molecular weight among the polymer blocks A1 is from 5,000 to 60,000, the number average molecular weight Mn(c) of the polyphenylene ether resin (c) is from 1,000 to 50,000, and Mn(A1')/Mn(c)=1.2-3.0.

[14] The thermoplastic elastomer composition according to any one of [1] to [13], wherein a content of the polypropylene-based resin (b) is from 15 to 50 parts by mass relative to 100 parts by mass of the hydrogenated block copolymer (a).

[15] The thermoplastic elastomer composition according to any one of [1] to [14], wherein an average particle diameter of the polyphenylene ether resin (c) is from 100 to 500 μm.

[16] The thermoplastic elastomer composition according to any one of [1] to [15], which has a hardness of 40 or lower and a compression set of 35% or lower.

[17] The thermoplastic elastomer composition according to any one of [1] to [16], further comprising carbon black (e) and/or an inorganic filler (f) at a quantity of from 3 to 100 parts by mass relative to 100 parts by mass of the hydrogenated block copolymer (a).

[18] The thermoplastic elastomer composition according to any one of [1] to [17], which is partially crosslinked in the presence of an organic peroxide (g).

[19] A stopper for a medical container, comprising a sealing material that comprises the thermoplastic elastomer composition according to any one of [1] to [18].

[20] A medical container comprising the stopper for a medical container according to [19].

Advantageous Effects of Invention

According to the present invention, it is possible to obtain a thermoplastic elastomer composition, a stopper for a medical container, and a medical container which realize excellent needlestick resistance and liquid leakage resistance.

DESCRIPTION OF EMBODIMENTS

Embodiments for carrying out the present invention (hereinafter referred to simply as "the present embodiment") will now be explained in detail. The present invention is not limited to the embodiment given below, and can be variously altered within the gist of the invention.

A thermoplastic elastomer composition of the present embodiment comprises 100 parts by mass of (a) a hydrogenated block copolymer, from 3 to 50 parts by mass of (b) a polypropylene-based resin, from 5 to 100 parts by mass of (c) a polyphenylene ether resin and from 50 to 200 parts by mass of (d) a non-aromatic softener, the hydrogenated block copolymer (a) is a hydrogenated block copolymer (a-1) that is able to be formed by hydrogenating a block copolymer that comprises at least one polymer block A1 comprising a vinyl aromatic hydrocarbon compound monomer unit as a primary component and at least one polymer block B1 comprising a conjugated diene compound monomer unit as a primary component, and the weight average molecular weight of the hydrogenated block copolymer (a-1) is from 100,000 to 350,000.

Furthermore, another thermoplastic elastomer composition of the present embodiment comprises 100 parts by mass of (a) a hydrogenated block copolymer, from 3 to 50 parts by mass of (b) a polypropylene-based resin, from 5 to 100 parts by mass of (c) a polyphenylene ether resin and from 50 to 200 parts by mass of (d) a non-aromatic softener, the hydrogenated block copolymer (a) comprises a hydrogenated block copolymer (a-1') that is able to be formed by hydrogenating a block copolymer that comprises at least one polymer block A1 comprising a vinyl aromatic hydrocarbon compound monomer unit as a primary component and at least one polymer block B1 comprising a conjugated diene compound monomer unit as a primary component and a hydrogenated block copolymer (a-2) that is able to be formed by hydrogenating a block copolymer that comprises at least one polymer block A2 comprising a vinyl aromatic hydrocarbon compound monomer unit as a primary component and at least one polymer block B2 comprising a conjugated diene compound monomer unit as a primary component, the weight average molecular weight of the hydrogenated block copolymer (a-1') is from 140,000 to 350,000, the weight average molecular weight of the hydrogenated block copolymer (a-2) is from 50,000 to 120,000, and the mass ratio of the hydrogenated block copolymer (a-1') and the hydrogenated block copolymer (a-2) ((a-1')/(a-2)) is from 70/30 to 95/5.

By being constituted in this way, the thermoplastic elastomer composition of the present embodiment exhibits excellent liquid leakage resistance. Furthermore, the thermoplastic elastomer composition of the present embodiment is flexible and exhibits excellent needlestick resistance. Each component will now be explained in detail.

<Hydrogenated Block Copolymer (a-1) and Hydrogenated Block Copolymer (a-1')>

The hydrogenated block copolymer (a-1) and hydrogenated block copolymer (a-1') are hydrogenated block copolymers formed by hydrogenating a block copolymer that comprises at least one polymer block A1 comprising vinyl aromatic hydrocarbon compound monomer units as a primary component and at least one polymer block B1 comprising conjugated diene compound monomer units as a primary component.

In the present embodiment, the polymer block A1 comprising a vinyl aromatic hydrocarbon compound monomer unit as a primary component means that the content of vinyl aromatic hydrocarbon compound monomer units in the polymer block A1 is greater than 50 mass %, preferably not less than 60 mass %, more preferably not less than 70 mass %, further preferably not less than 80 mass %, and yet further preferably not less than 90 mass %.

Similarly, the polymer block B1 comprising a conjugated diene compound monomer unit as a primary component means that the content of conjugated diene compound monomer units in the polymer block B1 is greater than 50 mass %, preferably not less than 60 mass %, more preferably not less than 70 mass %, further preferably not less than 80 mass %, and yet further preferably not less than 90 mass %.

In the present embodiment, the monomer units constituting the block copolymers are named after the monomers from which the monomer units are derived. For example, "vinyl aromatic hydrocarbon compound monomer unit" means a constituent unit of a polymer produced by polymerizing vinyl aromatic hydrocarbon compounds, which are monomers, and has a molecular structure in which two carbon atoms of the substituent ethylene group derived from the substituent vinyl group are bonding sites. In addition, "conjugated diene compound monomer unit" means a constituent unit of a polymer produced by polymerizing conjugated diene compounds, which are monomers, and has a molecular structure in which two carbon atoms of the olefin derived from the conjugated diene compound monomer are bonding sites.

In the present embodiment, a monomer that can be used for a vinyl aromatic hydrocarbon compound monomer unit in the polymer block A1 is a compound having a vinyl group and an aromatic ring. Vinyl aromatic hydrocarbon compound monomers are not limited to those given below, but examples thereof include styrene, α-methylstyrene, p-methylstyrene, divinylbenzene, 1,1-diphenylethylene, N,N-dimethyl-p-aminoethylstyrene and N,N-diethyl-p-aminoethylstyrene. Of these, styrene, α-methylstyrene and divinylbenzene can be advantageously used from the perspectives of polymerization properties and physical properties. These vinyl aromatic hydrocarbon compound monomers may be used singly, or in combination of two or more thereof.

A monomer that can be used for a conjugated diene compound monomer unit in the polymer block B1 is a diolefin having a pair of conjugated double bonds (two double bonds that are linked in a conjugated manner). Conjugated diene compounds are not limited to those given below, but examples thereof include 1,3-butadiene, 2-methyl-1,3-butadiene (isoprene), 2,3-dimethyl-1,3-butadiene, 1,3-pentadiene, 2-methyl-1,3-pentadiene and 1,3-hexadiene. Of these, 1,3-butadiene and 2-methyl-1,3-butadiene (isoprene) can be advantageously used from the perspectives of polymerization properties and physical properties. These conjugated diene compound monomers may be used singly, or in combination of two or more thereof.

The hydrogenated block copolymers (a-1) and (a-1') are not limited to those given below, but examples thereof have structures such as those represented by general formulae (1) to (7) below. Furthermore, the hydrogenated block copolymers (a-1) and (a-1') may contain a plurality of structures such as those represented by general formulae (1) to (7) below in arbitrary proportions.

(A1-B)$n$ (1)

A1-(B1-A1)$n$ (2)

B1-(A1-B1)$n$ (3)

[(B1-A1)$n$]$m$-Z (4)

[(A1-B1)$n$]$m$-Z (5)

[(B1-A1)$n$-B1]$m$-Z (6)

[(A1-B1)$n$-A1]$m$-Z (7)

In the general formulae listed above, A1 is a polymer block containing a vinyl aromatic hydrocarbon compound monomer unit as a primary component and B1 is a polymer block containing a conjugated diene compound monomer unit as a primary component. The boundary between the polymer block A1 and the polymer block B1 need not necessarily be clear. In addition, n is an integer of 1 or higher, and preferably an integer of from 1 to 5. m is an integer of 2 or higher, preferably an integer of from 2 to 11, and more preferably an integer of from 2 to 8. Z is a coupling agent residue. Here, coupling agent residue means a residue of a coupling agent after being used to bond a plurality of copolymers comprising conjugated diene compound monomer units and vinyl aromatic hydrocarbon compound monomer units between a polymer block A1 and a polymer block A1, between a polymer block B1 and a polymer block B1, or between a polymer block A1 and a polymer block B1. The coupling agent is not limited to those given below, but examples thereof include the polyhalogen compounds and acid esters mentioned later.

In the general formulae listed above, the vinyl aromatic hydrocarbon compound monomer units in the polymer block A1 and polymer block B1 may be evenly distributed or distributed in a tapering manner. In addition, in cases where the polymer block A1 and polymer block B1 are copolymer blocks of vinyl aromatic hydrocarbon compound monomer units and conjugated diene compound monomer units, said copolymer blocks can contain multiple sections where the vinyl aromatic hydrocarbon compound monomer units are evenly distributed and/or distributed in a tapering manner. Furthermore, the copolymer block sections mentioned above can contain a plurality of sections having different vinyl aromatic hydrocarbon compound monomer unit contents.

In cases where the hydrogenated block copolymer (a-1) or (a-1') has at least two polymer blocks A1 and at least two polymer blocks B1, it is preferable that at least one polymer block B1 is located at a polymer end and that the content of the polymer blocks B1 located at the polymer end is 0.5 to 9 mass %, and more preferably 1 to 7 mass %. By having at least one polymer block B1 at the polymer end and setting the content of the polymer blocks B1 located at the polymer end to be 0.5 to 9 mass %, the flexibility tends to be further improved. The content of the polymer blocks B located at the polymer end can be determined by calculating from the mass of conjugated diene polymerized at polymer ends and the total mass of monomers used in the polymerization reaction.

The weight average molecular weight of the hydrogenated block copolymer (a-1) is from 100,000 to 350,000. This weight average molecular weight is preferably not less than 120,000, and more preferably not less than 140,000. In addition, this weight average molecular weight is preferably not more than 340,000, more preferably not more than 330,000, further preferably not more than 300,000, further preferably not more than 290,000, and further preferably not more than 280,000.

In addition, this weight average molecular weight is preferably from 120,000 to 290,000, and more preferably from 140,000 to 280,000.

If the weight average molecular weight of the hydrogenated block copolymer (a-1) is less than 100,000, the liquid leakage resistance of the thermoplastic elastomer composition of the present embodiment tends to decrease. If the weight average molecular weight of the hydrogenated block copolymer (a-1) exceeds 350,000, the moldability of the thermoplastic elastomer composition may deteriorate due to the decrease in the fluidity of the composition.

The weight average molecular weight of the hydrogenated block copolymer (a-1') is from 140,000 to 350,000. This weight average molecular weight is preferably not less than 150,000, and more preferably not less than 160,000. In addition, this weight average molecular weight is preferably not more than 340,000, more preferably not more than 330,000, further preferably not more than 300,000, further preferably not more than 290,000, and most preferably not more than 280,000.

In addition, this weight average molecular weight is preferably from 150,000 to 290,000, and more preferably from 160,000 to 280,000.

If the weight average molecular weight of the hydrogenated block copolymer (a-1') is less than 140,000, the liquid leakage resistance of the thermoplastic elastomer composition of the present embodiment tends to decrease. If the weight average molecular weight of the hydrogenated block copolymer (a-1') exceeds 350,000, there are concerns that the moldability of the thermoplastic elastomer composition will deteriorate due to the decrease in the fluidity of the composition.

The molecular weight distribution (Mw/Mn) of the hydrogenated block copolymers (a-1) and (a-1') is preferably from 1.01 to 8.0, more preferably from 1.01 to 6.0, and further preferably from 1.01 to 5.0. If this molecular weight distribution falls within the range mentioned above, it tends to be possible to achieve better moldability.

The shape of the molecular weight distribution, as measured by GPC, of the hydrogenated block copolymers (a-1) and (a-1') is not particularly limited, and may have a polymodal molecular weight distribution in which two or more peaks are present or a monomodal molecular weight distribution in which one peak is present.

The weight average molecular weight (Mw) and molecular weight distribution (Mw/Mn; the ratio of the weight average molecular weight (Mw) to the number average molecular weight (Mn)) of the hydrogenated block copolymers (a-1) and (a-1') can be determined by obtaining the molecular weight of a peak in a chromatogram, which is measured by means of gel permeation chromatography (GPC) using the method described in the examples below, using a calibration curve determined from measurements using a commercially available standard polystyrene (using a peak molecular weight of the standard polystyrene).

Furthermore, when the polymer block having the greatest number average molecular weight in the polymer block A1 comprising a vinyl aromatic hydrocarbon compound monomer unit as a primary component is deemed to be polymer block A1', the number average molecular weight Mn(A1') of block chains of the polymer block A1' is preferably from 5000 to 60,000, more preferably from 10,000 to 50,000, and further preferably from 10,000 to 45,000. If the number average molecular weight Mn(A1') of block chains of the polymer block A1' falls within the range mentioned above, compatibility between the hydrogenated block copolymer (a) and the polyphenylene ether resin (c) described below tends to improve and it tends to be possible to obtain a thermoplastic elastomer composition having superior liquid leakage resistance.

The number average molecular weight of the polymer block A1' can be determined by obtaining a polymer block component (excluding polymer components comprising vinyl aromatic monomer units having an average degree of polymerization of approximately 30 or less) comprising vinyl aromatic hydrocarbon compound monomer units by means of a method of oxidatively decomposing the hydrogenated block copolymer (a) with t-butylhydroperoxide using osmium tetroxide as a catalyst (the method disclosed in I. M. KOLTHOFF, et al., J. Polym. Soi. 1,429 (1946)), and then measuring the number average molecular weight by means of GPC in the same way as in the method described above.

The total content of vinyl aromatic hydrocarbon compound monomer units in the hydrogenated block copolymer (a-1) and the hydrogenated block copolymer (a-1') is preferably from 26 to 70 mass %.

This total content is more preferably not less than 28 mass %, and further preferably not less than 30 mass %. In addition, this total content is more preferably not more than 65 mass %, further preferably not more than 60 mass %, further preferably not more than 50 mass %, and further preferably not more than 45 mass %.

In addition, this total content is more preferably from 28 to 65 mass %, further preferably from 30 to 65 mass %, further preferably from 30 to 60 mass %, further preferably 30 to 50 mass %, and most preferably from 30 to 45 mass %.

The content of conjugated diene compound monomer units in the hydrogenated block copolymer (a-1) and the hydrogenated block copolymer (a-1') is preferably from 30 to 74 mass %, more preferably from 35 to 72 mass %, further preferably from 35 to 70 mass %, further preferably from 40 to 70 mass %, further preferably from 50 to 70 mass %, and most preferably from 55 to 70 mass %.

If the total content of vinyl aromatic hydrocarbon compound monomer units in the hydrogenated block copolymer (a-1) and the hydrogenated block copolymer (a-1') is not less than 26 mass %, the strength of the thermoplastic elastomer composition tends to improve, and if the total content of vinyl aromatic hydrocarbon compound monomer units is not more than 70 mass %, the flexibility of the thermoplastic elastomer composition tends to improve. The total content of vinyl aromatic hydrocarbon compound monomer units can be calculated from the absorption intensity at 262 nm obtained by means of the method disclosed in the examples given below using an ultraviolet radiation spectrophotometer.

The microstructure (cis, trans and vinyl proportions) of polymer block B in the hydrogenated block copolymer (a-1) and the hydrogenated block copolymer (a-1') can be arbitrarily adjusted by using the polar compounds mentioned below, or the like.

The vinyl bond content before hydrogenation in the conjugated diene compound monomer units in the hydrogenated block copolymer (a-1) and the hydrogenated block copolymer (a-1') is preferably from 30 to 60 mol. %, more preferably from 30 to 55 mol. %, and further preferably from 30 to 50 mol. %. If the vinyl bond content before hydrogenation in the conjugated diene compound monomer units is not less than 30 mol. %, compatibility between the hydrogenated block copolymer (a-1) or hydrogenated block copolymer (a-1') and the polypropylene-based resin (b) described below tends to improve, and if the vinyl bond content before hydrogenation in the conjugated diene compound monomer units is not more than 60 mol. %, strength tends to improve.

As mentioned above, in the present embodiment, the total content of vinyl aromatic hydrocarbon compound monomer units in the hydrogenated block copolymer (a-1) and the hydrogenated block copolymer (a-1') is preferably from 26 to 70 mass %, and the vinyl bond content before hydrogenation in the conjugated diene compound monomer units is particularly preferably from 30 to 60 mol. %.

In the present embodiment, vinyl bond content means the total content (proportion) of 1,2-vinyl bonds (conjugated diene compound monomer units incorporated in the polymer by 1,2-bonds) and 3,4-vinyl bonds (conjugated diene compound monomer units incorporated in the polymer by 3,4-bonds) (or the content of 1,2-vinyl bonds in cases where 1,3-butadiene is used as a conjugated diene compound monomer) relative to all conjugated diene compound monomer units contained in the hydrogenated block copolymer (a-1) and the hydrogenated block copolymer (a-1'). The vinyl bond content before hydrogenation in conjugated diene monomer units can be measured using nuclear magnetic resonance (NMR).

The degree of hydrogenation of aliphatic double bonds derived from conjugated diene compounds in the hydrogenated block copolymer (a-1) and the hydrogenated block copolymer (a-1') is preferably not less than 50%, more preferably not less than 60%, and further preferably not less than 70%. If the degree of hydrogenation is not less than 50%, it tends to be possible to effectively suppress a deterioration in mechanical properties caused by thermal degradation (oxidative degradation). In addition, if the degree of hydrogenation is not less than 70%, it tends to be possible to achieve even better weathering resistance. The upper limit for the degree of hydrogenation is not particularly limited, but is preferably not more than 100%, and more preferably not more than 99%.

Furthermore, in cases where the thermoplastic elastomer composition of the present embodiment is partially crosslinked using an organic peroxide (g) described below, the degree of hydrogenation is preferably not less than 50% and more preferably not less than 60% from the perspective of heat resistance, and is preferably not more than 90% and more preferably not more than 85% from the perspectives of moldability and crosslinking reaction properties.

The degree of hydrogenation of aromatic double bonds derived from vinyl aromatic hydrocarbon compound monomer units in the hydrogenated block copolymer (a-1) and the hydrogenated block copolymer (a-1') is not particularly limited, but is preferably not more than 50%, more preferably not more than 30%, and further preferably not more than 20%.

<Hydrogenated Block Copolymer (a-2)>

From the perspective of improving the balance between needlestick resistance and liquid leakage resistance, the hydrogenated block copolymer (a) may be a mixture of the hydrogenated block copolymer (a-1') and a hydrogenated block copolymer (a-2) described below. In such cases, the mass ratio of the hydrogenated block copolymer (a-1') and the hydrogenated block copolymer (a-2) ((a-1')/(a-2)) is from 70/30 to 95/5. If the mass ratio of the hydrogenated block copolymer (a-1') and the hydrogenated block copolymer (a-2) falls within the range mentioned above, the balance between needlestick resistance and liquid leakage resistance can be improved. From the same perspective, the mass ratio mentioned above is preferably from 35/75 to 60/40, and more preferably from 40/60 to 60/40.

The hydrogenated block copolymer (a-2) in the present embodiment is a hydrogenated block copolymer formed by hydrogenating a block copolymer that comprises at least one polymer block A2 comprising a vinyl aromatic hydrocarbon compound monomer unit as a primary component and at least one polymer block B2 comprising a conjugated diene compound monomer unit as a primary component, and has a weight average molecular weight of 50,000 to 120,000.

In the present embodiment, the polymer block A2 comprising a vinyl aromatic hydrocarbon compound monomer unit as a primary component means that the content of vinyl aromatic hydrocarbon compound monomer units in the polymer block A2 is greater than 50 mass %, preferably not less than 60 mass %, more preferably not less than 70 mass %, further preferably not less than 80 mass %, and yet further preferably not less than 90 mass %.

Similarly, the polymer block B2 comprising a conjugated diene compound monomer unit as a primary component means that the content of conjugated diene compound monomer units in the polymer block B2 is greater than 50 mass %, preferably not less than 60 mass %, more preferably not less than 70 mass %, further preferably not less than 80 mass %, and yet further preferably not less than 90 mass %.

In the present embodiment, a monomer that can be used for a vinyl aromatic hydrocarbon compound monomer unit in the polymer block A2 is a compound having a vinyl group and an aromatic ring. Vinyl aromatic hydrocarbon compound monomers are not limited to those given below, but examples thereof include styrene, α-methylstyrene, p-methylstyrene, divinylbenzene, 1,1-diphenylethylene, N,N-dimethyl-p-aminoethylstyrene and N,N-diethyl-p-aminoethylstyrene. Of these, styrene, α-methylstyrene and divinylbenzene can be advantageously used from the perspectives of polymerization properties and other properties. These vinyl aromatic hydrocarbon compound monomers can be used singly, or in combination of two or more thereof.

A monomer that can be used for a conjugated diene compound monomer unit in the polymer block B2 is a diolefin having a pair of conjugated double bonds (two double bonds that are linked in a conjugated manner). Conjugated diene compounds are not limited to those given below, but examples thereof include 1,3-butadiene, 2-methyl-1,3-butadiene (isoprene), 2,3-dimethyl-1,3-butadiene, 1,3-pentadiene, 2-methyl-1,3-pentadiene and 1,3-hexadiene. Of these, 1,3-butadiene and 2-methyl-1,3-butadiene (isoprene) can be advantageously used from the perspectives of polymerization properties and other properties. These conjugated diene compound monomers can be used singly, or in combination of two or more thereof.

The hydrogenated block copolymer (a-2) is not limited to those given below, but examples thereof have structures such as those represented by general formulae (85) to (14) below. Furthermore, the hydrogenated block copolymer (a-2) may contain a plurality of structures such as those represented by general formulae (8) to (14) below in arbitrary proportions.

(A2-B2)*n*       (8)

A2-(B2-A2)*n*       (9)

B2-(A2-B2)*n*       (10)

[(B2-A2)*n*]*m*-Z       (11)

[(A2-B2)*n*]*m*-Z       (12)

[(B2-A2)*n*-B1]*m*-Z       (13)

[(A2-B2)*n*-A1]*m*-Z       (14)

In the general formulae listed above, A2 is a polymer block containing a vinyl aromatic hydrocarbon compound monomer unit as a primary component and B2 is a polymer block containing a conjugated diene compound monomer unit as a primary component. The boundary between the polymer block A2 and the polymer block B2 need not necessarily be clear. In addition, n is an integer of 1 or higher, and preferably an integer of from 1 to 5. m is an integer of 2 or higher, preferably an integer of from 2 to 11, and more preferably an integer of from 2 to 8. Z is a coupling agent residue. Here, coupling agent residue means a residue of a coupling agent after being used to bond a plurality of copolymers comprising conjugated diene compound monomer units and vinyl aromatic hydrocarbon compound monomer units between a polymer block A2 and a polymer block A2, between a polymer block B2 and a polymer block B2, or between a polymer block A2 and a polymer block B2. The coupling agent is not limited to those given below, but examples thereof include the polyhalogen compounds and acid esters mentioned later.

In the general formulae listed above, the vinyl aromatic hydrocarbon compound monomer units in the polymer block A2 and polymer block B2 may be evenly distributed or distributed in a tapering manner. In addition, in cases where the polymer block A2 and polymer block B2 are copolymer blocks of vinyl aromatic hydrocarbon compound monomer units and conjugated diene compound monomer units, said copolymer blocks can contain multiple sections where the vinyl aromatic hydrocarbon compound monomer units are evenly distributed and/or distributed in a tapering manner. Furthermore, the copolymer block sections mentioned above can contain a plurality of sections having different vinyl aromatic hydrocarbon compound monomer unit contents.

The weight average molecular weight of the hydrogenated block copolymer (a-2) is 50,000 to 120,000. If the weight average molecular weight of the hydrogenated block copolymer (a-2) is not less than 50,000, the strength of the thermoplastic elastomer composition of the present embodiment improves. If the weight average molecular weight of the hydrogenated block copolymer (a-2) is not more than 120,000, the rebound resilience of the thermoplastic elastomer improves and the effect of improving the flexibility and needlestick resistance of the stopper for a medical container of the present embodiment can be satisfactorily achieved. From the same perspectives, the weight average molecular weight of the hydrogenated block copolymer (a-2) is preferably 55,000 to 110,000, and more preferably 60,000 to 100,000.

The molecular weight distribution (Mw/Mn) of the hydrogenated block copolymer (a-2) is preferably 1.01 to 8.0, more preferably 1.01 to 6.0, and further preferably 1.01 to 5.0. If this molecular weight distribution falls within the range mentioned above, it tends to be possible to achieve better moldability. The Mw and Mn values of the hydrogenated block copolymer (a-2) can also be measured by means of GPC, in the manner described above.

The shape of the molecular weight distribution of the hydrogenated block copolymer (a-2) is not particularly limited, and may have a polymodal molecular weight distribution in which two or more peaks are present or a monomodal molecular weight distribution in which one peak is present.

The total content of vinyl aromatic hydrocarbon compound monomer units in the hydrogenated block copolymer (a-2) is preferably 10 to 25 mass %, more preferably 12 to 23 mass %, and further preferably 12 to 20 mass %. If the total content of vinyl aromatic hydrocarbon compound monomer units in the hydrogenated block copolymer (a-2) is not less than 10 mass %, the strength exhibited by the thermoplastic elastomer composition is further improved, and if the total content of vinyl aromatic hydrocarbon compound monomer units is not more than 25 mass %, the flexibility exhibited by the thermoplastic elastomer composition is further improved and needlestick resistance is further improved.

The vinyl bond content before hydrogenation in the conjugated diene compound monomer units in the hydrogenated block copolymer (a-2) is preferably 40 to 60 mol. %, more preferably 45 to 60 mol. %, and further preferably 50 to 60 mol. %. If the vinyl bond content before hydrogenation in the conjugated diene compound monomer units is not less than 40 mol. %, the rebound resilience of the thermoplastic elastomer of the present embodiment tends to improve and compatibility with the polypropylene resin (a-2) described below tends to improve, and if the vinyl bond content before hydrogenation in the conjugated diene compound monomer units is not more than 60 mol. %, the liquid leakage resistance and strength exhibited by the thermoplastic elastomer composition of the present embodiment tend to be further improved.

From the perspectives mentioned above, it is particularly preferable for the total content of vinyl aromatic hydrocarbon compound monomer units to be 10 to 25 mass % and for the vinyl bond content before hydrogenation in the conjugated diene compound monomer units to be 40 to 60 mol. % in the hydrogenated block copolymer (a-2) in the present embodiment.

The heat of crystal fusion ($\Delta H$) of the hydrogenated block copolymer (a-2) is preferably less than 0.5 J/g, more preferably less than 0.4 J/g, and further preferably less than 0.3 J/g. If the heat of crystal fusion ($\Delta H$) is less than 0.5 J/g, the thermoplastic elastomer composition of the present embodiment tends to achieve satisfactory rebound resilience and compression set and tends to exhibit improved balance between liquid leakage resistance and resealing properties. The lower limit for the heat of crystal fusion ($\Delta H$) is not particularly limited, but is preferably not less than 0.01 J/g. The heat of crystal fusion ($\Delta H$) is determined by means of a DSC (differential scanning calorimeter) as described in the Examples below.

It is generally known that crystals of hydrogenated block copolymers formed by hydrogenating copolymers of vinyl aromatic hydrocarbon compound monomer units and conjugated diene compound monomer units disappear if the vinyl bond content before hydrogenation is 60 mol. % or more in a polymer block comprising a conjugated diene compound monomer unit as a primary component. The hydrogenated block copolymer (a-2) of the present embodiment preferably has a heat of crystal fusion ($\Delta H$) of less than 0.5 J/g even when the vinyl group content before hydrogenation in the polymer block B2 is 40 to 60 mol. %. This means that the hydrogenated block copolymer (a-2) has no crystals or has an extremely low degree of crystallization even if crystals are present. In this way, the rebound resilience exhibited by the thermoplastic elastomer composition of the present embodiment tends to improve and liquid leakage resistance tends to improve.

The heat of crystal fusion ($\Delta H$) of the hydrogenated block copolymer (a-2) can be adjusted by setting the peak temperature inside the reactor and/or the difference between the maximum and minimum temperatures inside the reactor to fall within specific ranges while polymerizing the polymer block B2 comprising a conjugated diene compound monomer unit as a primary component. Specifically, if the temperature range ($\Delta T$), which is the difference between the maximum and minimum temperatures inside the reactor, is not higher than 20° C., the heat of crystal fusion ($\Delta H$) of the ultimately obtained hydrogenated block copolymer (a-2) tends to decrease, which is desirable. In addition, the peak temperature inside the reactor is preferably not higher than 90° C., and if the peak temperature inside the reactor is set to be not higher than 90° C., the heat of crystal fusion ($\Delta H$) tends to decrease. The heat of crystal fusion ($\Delta H$) can be adjusted by controlling the peak temperature inside the reactor and/or the difference between the maximum and minimum temperatures inside the reactor based on the tendencies mentioned above.

The peak temperature inside the reactor is more preferably not higher than 85° C., and further preferably not higher than 80° C. In addition, the temperature range ($\Delta T$) is more preferably 15° C. or less, and further preferably 10° C. or less. If the peak temperature inside the reactor is not higher than 90° C. or if the temperature range ($\Delta T$) is 20° C. or less, the heat of crystal fusion ($\Delta H$) of the hydrogenated block copolymer (a-2) tends to decrease and the strain recovery exhibited by the thermoplastic elastomer composition of the present embodiment tends to be further improved.

A method of eliminating reaction heat by cooling can be given as an example of a method for setting the peak temperature in the reactor to be not higher than 90° C. or setting the temperature range ($\Delta T$) inside the reactor to be 20° C. or less.

The degree of hydrogenation of aliphatic double bonds derived from the conjugated diene in the hydrogenated block copolymer (a-2) is preferably not less than 80%, and more preferably not less than 90%. If the degree of hydrogenation is not less than 80%, it is possible to suppress a deterioration in mechanical properties caused by thermal degradation (oxidative degradation). The upper limit for the degree of hydrogenation is not particularly limited, but is preferably not more than 100%, and more preferably not more than 99%.

The degree of hydrogenation of aromatic double bonds derived from vinyl aromatic hydrocarbon compound monomer units in the hydrogenated block copolymer (a-2) is not particularly limited, but is preferably not more than 50%, more preferably not more than 30%, and further preferably not more than 20%.

The method for producing the hydrogenated block copolymer (a) is not limited to those given below, but examples thereof include the methods disclosed in Japanese Examined Patent Publication Nos. S36-19286, S43-17979, S46-32415, S49-36957, S48-2423, S48-4106 and S51-49567 and Japanese Patent Application Publication No. S59-166518.

The method for producing the copolymer comprising conjugated diene compound monomer units and vinyl aromatic hydrocarbon compound monomer units is not limited to those given below, but it can, for example, be obtained by a method of carrying out anion living polymerization in a hydrocarbon solvent using an initiator such as an alkali metal compound. The hydrocarbon solvent is not particularly limited, and examples thereof include aliphatic hydrocarbons such as n-butane, isobutane, n-pentane, n-hexane, n-heptane and n-octane, alicyclic hydrocarbons such as cyclohexane, cycloheptane and methylcycloheptane, and aromatic hydrocarbons such as benzene, toluene, xylene and ethylbenzene.

The polymerization initiator is not particularly limited, and an organic alkali metal compound that is known in general to exhibit anion polymerization activity for conjugated diene compound monomers and vinyl aromatic hydrocarbon compound monomers can be used, and examples thereof include alkali metal compounds of aliphatic hydrocarbons having 1 to 20 carbon atoms, alkali metal compounds of aromatic hydrocarbons having 1 to 20 carbon atoms and alkali metal compounds of organic amines having 1 to 20 carbon atoms. The alkali metal contained in the initiator is not limited to those given below, but examples thereof include lithium, sodium and potassium. One or two or more types of alkali metals may be contained in one molecule. Although not limited to those given below, specific examples include n-propyl lithium, n-butyl lithium, sec-butyl lithium, tert-butyl lithium, n-pentyl lithium, n-hexyl lithium, benzyl lithium, phenyl lithium, tolyl lithium, a reaction product of diisopropenylbenzene and sec-butyl lithium, and a reaction product of divinylbenzene, sec-butyl lithium and a small quantity of 1,3-butadiene. Furthermore, it is possible to use a lithium compound comprising 1-(t-butoxy)propyl lithium and one or several molecules of monomeric isoprene that is added in order to improve the solubility of the 1-(t-butoxy)propyl lithium, as disclosed in the description of U.S. Pat. No. 5,708,092, a siloxy group-containing alkyl lithium compound such as 1-(t-butyldimethylsiloxy)hexyl lithium, as disclosed in UK Patent Specification No. 2,241,239, or an amino lithium compound, such as an amino group-containing alkyl lithium compound, diisopropylamide lithium and hexamethyldisilazide lithium, as disclosed in U.S. Pat. No. 5,527,753.

When copolymerizing a conjugated diene compound monomer and a vinyl aromatic hydrocarbon compound monomer using an organic alkali metal compound as a polymerization initiator, it is possible to add a tertiary amine compound or an ether compound as an adjuster in order to adjust the content of vinyl bonds (1,2-bonds or 3,4-bonds) derived from the conjugated diene compound monomer contained in the copolymer or adjust the random copolymerizability of the conjugated diene compound monomer and the vinyl aromatic hydrocarbon compound monomer.

The method for copolymerizing the conjugated diene compound monomer and the vinyl aromatic hydrocarbon compound monomer using an organic alkali metal compound as a polymerization initiator is not particularly limited, and it is possible to use a batch-type polymerization method, a continuous polymerization method, or a combination thereof. From the perspective of adjusting the molecular weight distribution within a suitable range, a continuous polymerization method is preferred. The polymerization temperature is not particularly limited, but is generally 0° C. to 180° C., and preferably 30° C. to 150° C. The time required for polymerization varies according to the conditions, but is generally not more than 48 hours, and is preferably 0.1 to 10 hours. In addition, it is preferable to carry out the polymerization in an inert gas atmosphere, such as nitrogen gas. The polymerization pressure should be a pressure that is sufficient for maintaining the monomers and solvent in a liquid phase within the polymerization temperature range, and is not particularly limited.

Furthermore, a coupling reaction may be carried out by adding a required quantity of a difunctional or higher polyfunctional coupling agent upon completion of polymerization. The difunctional or higher polyfunctional coupling agent is not particularly limited, and can be a known coupling agent. Specific examples of difunctional coupling agents include dihalogen compounds, such as dimethyldichlorosilane and dimethyldibromosilane, and acid ester compounds such as methyl benzoate, ethyl benzoate, phenyl benzoate and phthalic acid esters.

Trifunctional or higher polyfunctional coupling agents are not limited to those given below, but examples thereof include trihydric or higher polyalcohols, polyvalent epoxy compounds, such as epoxidized soy bean oil and diglycidyl bisphenol A, silicon halide compounds represented by the formula $R^1_{(4-n)}SiX_n$ (here, $R^1$ is a hydrocarbon group having 1 to 20 carbon atoms, X is a halogen and n is an integer that is 3 or 4), and tin halide compounds.

Silicon halide compounds are not limited below, but examples thereof include methylsilyl trichloride, t-butylsilyl trichloride, silicon tetrachloride and bromides thereof.

Tin halide compounds are not limited to those given below, but examples thereof include polyvalent halogen compounds such as methyl tin trichloride, t-butyl tin trichloride and tin tetrachloride. In addition, dimethyl carbonate, diethyl carbonate, and the like, can also be used.

Hydrogenation catalysts that are used in order to produce the hydrogenated block copolymer are not particularly limited, and it is possible to use, for example, the hydrogenation catalysts disclosed in Japanese Examined Patent Publication Nos. S42-8704, S43-6636, S63-4841, H1-37970, H1-53851 and H2-9041. Preferred hydrogenation catalysts include mixtures of titanocene compounds and/or reducing organometallic compounds. Titanocene compounds are not particularly limited, but examples thereof include the compounds disclosed in Japanese Patent Application Publication No. H8-109219, and specific examples thereof include compounds having at least one ligand having a (substituted) cyclopentadienyl structure, such as bis(cyclopentadienyl) titanium dichloride and monopentamethylcyclopentadienyl titanium trichloride, an indenyl structure or a fluorenyl structure. Reducing organometallic compounds are not particularly limited, but examples thereof include organic alkali metal compounds, such as organic lithium compounds, organic magnesium compounds, organic aluminum compounds, organic boron compounds and organic zinc compounds.

The hydrogenation reaction temperature is generally 0° C. to 200° C., and preferably 30° C. to 150° C. The pressure of hydrogen used in the hydrogenation reaction is preferably 0.1 to 15 MPa, more preferably 0.2 to 10 MPa, and further preferably 0.3 to 5 MPa. The hydrogenation reaction time is generally from 3 minutes to 10 hours, and preferably from 10 minutes to 5 hours. Moreover, the hydrogenation reaction can be carried out as a batch process, a continuous process or a combination thereof.

Following completion of the hydrogenation reaction, catalyst residue may, if necessary, be removed from the reaction solution. The method for separating the hydrogenated block copolymer from the solvent is not limited below, but examples thereof include a method of adding a polar solvent that is a poor solvent for the hydrogenated block copolymer, such as acetone or an alcohol, to the hydrogenated block copolymer solution so as to precipitate the hydrogenated block copolymer and then recovering the hydrogenated block copolymer, a method of introducing the hydrogenated block copolymer solution into hot water under stirring, removing the solvent by steam stripping, and then recovering the hydrogenated block copolymer, and a method of distilling off the solvent by directly heating the hydrogenated block copolymer solution.

An antioxidant may be added to the reaction solution when producing the hydrogenated block copolymer (a). Antioxidants are not limited to those given below, but examples thereof include phenol-based antioxidants, phosphorus-based antioxidants, sulfur-based antioxidants and amine-based antioxidants. Specific examples thereof include 2,6-di-t-butyl-4-methylphenol, n-octadecyl-3-(4'-hydroxy-3',5'-di-t-butyl-phenyl)propionate, tetrakis-(methylene-3-(3',5'-di-t-butyl-4'-hydroxyphenyl)propionate)methane], tris-(3,5-di-t-butyl-4-hydroxybenzyl)isocyanurate, 4,4'-butylidene-bis-(3-methyl-6-t-butylphenol), 3,9-bis[2-{3-(3-t-butyl-4-hydroxy-5-methylphenyl)propionyloxy}-1,1-dimethylethyl]-2,4,8,10-tetraoxaspiro[5,5]undecane, tri (ethylene glycol)-bis[3-(3-t-butyl-5-methyl-4-hydroxyphenyl)propionate], 1,6-hexane diol-bis-(3-(3,5-di-t-butyl-4-hydroxyphenyl)propionate), 2,4-bis-(n-octylthio)-6-(4-hydroxy-3,5-di-t-butylanilino)1,3,5-triazine, pentaerythrityl.tetrakis[3-(3,5-di-t-butyl-4-hydroxyphenyl) propionate], 2,2-thio-diethylene-bis(3-(3,5-di-t-butyl-4-hydroxyphenyl)propionate), N,N'-hexamethylene-bis(3,5-di-t-butyl-4-hydroxy-hydrocinnamide), 3,5-di-t-butyl-4-hydroxybenzyl phosphonate-diethyl ester, 1,3,5-trimethyl-2,4,6-tris(3,5-di-t-butyl-4-hydroxybenzyl)benzene, a mixture of calcium bis(ethyl 3,5-di-t-butyl-4-hydroxybenzylphosphonate) and polyethylene wax (50%), octylated diphenylamine, 2,4-bis[(octylthio)methyl]-o-cresol, iso-octyl-3-(3,5-di-t-butyl-4-hydroxyphenyl)propionate, 3,3-bis(3-t-butyl-4-hydroxyphenyl)ethylene ester of butyric acid, 1,1,3-tris-(2-methyl-4-hydroxy-5-t-butylphenyl)butane, 1,3,5-tris(4-t-butyl-3-hydroxy-2,6-dimethylbenzyl)isocyanurate, 2-t-butyl-6-(3'-t-butyl-5'-methyl-2'-hydroxybenzyl)-4-methylphenyl.acrylate and 2-(1-(2-hydroxy-3,5-di-t-pentylphenyl)-ethyl)-4,6-di-t-pentylphenyl acrylate.

<Polypropylene-Based Resin (b)>

The polypropylene-based resin (b) of the present embodiment is not limited to those given below, but examples thereof include propylene homopolymers, block copolymers and random copolymers of propylene and olefins other than propylene (and preferably α-olefins having 2 to 20 carbon atoms), and blends thereof. α-olefins having 2 to 20 carbon atoms are not limited to those given below, but examples thereof include ethylene, 1-butene, 1-hexene, 4-methyl-1-pentene, 1-octene and 1-decene, with α-olefins having 2 to 8 carbon atoms being preferred, and ethylene, 1-butene, 1-hexene and 4-methyl-1-pentene being particularly preferred.

The above α-olefin having 2 to 20 carbon atoms may be used singly, or in combination of two or more thereof.

The polypropylene-based resin (b) used in the present embodiment preferably has a melt flow rate (MFR), as determined at a temperature of 230° C. under a load of 2.16 kg, of 0.1 to 50 g/10 min, more preferably 0.5 to 45 g/10 min, and further preferably 1.0 to 40 g/10 min. If the MFR value falls within the range mentioned above, workability and moldability tend to be further improved.

The method for producing the polypropylene-based resin (b) is not limited to that given below, but an example thereof is a production method that uses a Ziegler-Natta catalyst obtained by combining a titanium-containing solid transition metal component and an organometallic component. The transition metal component used in the Ziegler-Natta catalyst is not limited to those given below, but examples thereof include titanium trichloride and solid components having titanium, magnesium and halogen as essential components and an electronic-donating compound as an optional component, and the organometallic component is not limited to those given below, but examples thereof include aluminum compounds.

In addition, the polymerization method employed in producing the polypropylene-based resin (b) is not limited to those given below, but examples thereof include slurry polymerization methods, vapor phase polymerization methods, bulk polymerization methods, solution polymerization methods and multistage polymerization methods involving a combination of these polymerization methods. In these polymerization methods, propylene alone is polymerized to obtain a propylene homopolymer, and propylene and a monomer other than propylene are polymerized to obtain a copolymer.

In the thermoplastic elastomer composition of the present embodiment, the content of the polypropylene-based resin (b) is 3 to 50 parts by mass, preferably 15 to 50 parts by mass, and more preferably 20 to 45 parts by mass, relative to 100 parts by mass of the hydrogenated block copolymer (a). If the blending quantity of the polypropylene-based resin (b) is less than 3 parts by mass, there are concerns that the fluidity of the thermoplastic elastomer composition of the present embodiment will decrease and that molding processing properties will deteriorate. If the blending quantity of the polypropylene-based resin (b) exceeds 50 parts by mass, there are concerns that the flexibility of the thermoplastic elastomer composition of the present embodiment will decrease and that needlestick resistance will increase.

<Polyphenylene Ether Resin (c)>

The polyphenylene ether resin (c) of the present embodiment is preferably a homopolymer and/or copolymer having repeating structural units represented by formula (1) below.

[C1]

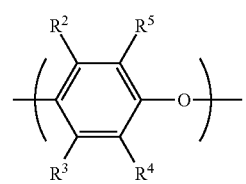

(1)

In formula (1), O is an oxygen atom, and $R^2$ to $R^5$ are each independently a hydrogen atom, a halogen atom, a primary or secondary C1-C7 alkyl group, a phenyl group, a C1-C7 haloalkyl group, a C1-C7 aminoalkyl group, a C1-C7 hydrocarbyloxy group or a hydrocarbyloxy group (here, at least two carbon atoms separate a halogen atom from an oxygen atom).

The method for producing the polyphenylene ether resin (c) is not particularly limited, and a known method can be used. For example, it is possible to use the production methods disclosed in U.S. Pat. Nos. 3,306,874, 3,306,875, 3,257,357 and 3,257,358, Japanese Patent Application Publication No. S50-51197, Japanese Examined Patent Publication Nos. S52-17880 and S63-152628.

Specific examples of the polyphenylene ether (c) are not limited to those given below, but examples thereof include homopolymers such as poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether) and polyphenylene ether copolymers, such as copolymers of 2,6-dimethylphenol and other phenol compounds (for example, a copolymer of 2,6-dimethylphenol and 2,3,6-trimethylphenol or a copolymer of 2,6-dimethylphenol and 2-methyl-6-butylphenol, as disclosed in Japanese Examined Patent Publication No. S52-17880). From the perspectives of industrial productivity and heat resistance, preferred examples include poly(2,6-dimethyl-1,4-phenylene ether), copolymers of 2,6-dimethylphenol and 2,3,6-trimethylphenol, and mixtures thereof.

Furthermore, the polyphenylene ether resin (c) may be a modified polyphenylene ether resin that is completely or partially modified. The modified polyphenylene ether resin mentioned here is a polyphenylene ether resin that is modified by at least one type of modifying compound which has at least one carbon-carbon double bond or carbon-carbon triple bond in the molecular structure and which has at least one carboxylic acid group, acid anhydride group, amino group, hydroxyl group or glycidyl group.

Modifying compounds which have at least one carbon-carbon double bond in the molecular structure and which have a carboxylic acid group or acid anhydride group are not limited to those given below, but examples thereof include maleic acid, fumaric acid, chloromaleic acid, cis-4-cyclohexene-1,2-dicarboxylic acid, and acid anhydrides thereof. Of these, fumaric acid, maleic acid and maleic acid anhydride are preferred, and fumaric acid and maleic acid anhydride are more preferred, from the perspective of compatibility. In addition, it is possible to use a compound in which one or two of the two carboxyl group in these unsaturated dicarboxylic acids is/are esterified.

Modifying compounds which have at least one carbon-carbon double bond in the molecular structure and which have a glycidyl group are not limited to those given below, but examples thereof include allyl glycidyl ether, glycidyl acrylate, glycidyl methacrylate and epoxidized natural oils and fats. Of these, glycidyl acrylate and glycidyl methacrylate are preferred.

Modifying compounds which have at least one carbon-carbon double bond in the molecular structure and which have a hydroxyl group are not limited to those given below, but examples thereof include allyl alcohol, unsaturated alcohols represented by the general formula $C_nH_{2n-3}OH$ (n is a positive integer), such as 4-penten-1-ol and 1,4-pentadien-3-ol, and unsaturated alcohols represented by the general formulae $C_nH_{2n-5}OH$ and $C_nH_{2n-7}OH$ (n is a positive integer).

These modifying compounds may be used singly, or in combination of two or more thereof.

The degree of addition of the modifying compound to the modified polyphenylene ether resin (c) is preferably 0.01 to 5 mass %, and more preferably 0.1 to 3 mass %. Moreover, unreacted modifying compound and/or polymers of the modifying compound may remain at a quantity of less than 1 mass % in the modified polyphenylene ether resin (c).

The reduced viscosity ηsp/C (measured at 30° C. in a 0.5 g/dL chloroform solution) of the polyphenylene ether resin (c) of the present embodiment preferably falls within the range of 0.15 to 0.70 dL/g, more preferably falls within the range of 0.20 to 0.60 dL/g, and further preferably falls within the range of 0.25 to 0.50 dL/g. If the reduced viscosity of the polyphenylene ether resin (c) is less than 0.15 dL/g, the mechanical properties of the thermoplastic elastomer composition of the present embodiment tend to deteriorate, and if the reduced viscosity of the polyphenylene ether resin (c) exceeds 0.70 dL/g, workability tends to deteriorate.

In the present embodiment, it is possible to use a blend of two or more types of polyphenylene ether resin having different reduced viscosities. In such cases, the reduced viscosity of a mixture obtained by blending a plurality of polyphenylene ether resins preferably falls within the range of 0.15 to 0.70 dL/g, but it is not necessary for the reduced viscosity of each polyphenylene ether resin (c) to fall within the range of 0.15 to 0.70 dL/g. The reduced viscosity of the polyphenylene ether resin (c) can be measured under the conditions disclosed in the examples described later.

In addition, the number average molecular weight of the polyphenylene ether resin (c) is preferably 1,000 to 50,000, more preferably 1,500 to 50,000, and further preferably 1,500 to 30,000. If the number average molecular weight of the polyphenylene ether resin (c) falls within the range mentioned above, it tends to be possible to obtain a thermoplastic elastomer composition having an even better balance between compression set and rebound resilience.

Furthermore, the ratio of the number average molecular weight of the polymer block A1' mentioned above and the number average molecular weight Mn(c) of the polyphenylene ether resin (c) ((Mn(A1')/Mn(c)) is preferably 1.2 to 3.0, more preferably 1.2 to 2.5, and further preferably 1.2 to 2.0. If the ratio of the number average molecular weight Mn(A1') of block chains of polymer block A1' and the number average molecular weight Mn(c) of the polyphenylene ether (c) falls within the range mentioned above, compatibility between the hydrogenated block copolymer (a) and the polyphenylene ether resin (c) tends to improve, retention of the non-aromatic softener (d) mentioned below tends to improve, and it tends to be possible to obtain a thermoplastic elastomer composition having even better liquid leakage resistance.

In the same way as for the hydrogenated block copolymer (a) described above, the number average molecular weight of the polyphenylene ether resin (c) can be determined by obtaining the molecular weight of a peak in a chromatogram, which is measured by means of GPC, using a calibration curve determined from measurements using a commercially available standard polystyrene (using a peak molecular weight of the standard polystyrene).

The polyphenylene ether (c) described above may be used alone, but may also be modified by being blended with a resin such as a polystyrene-based resin in order to improve workability. Examples of the polystyrene-based resins able to be used include general-purpose polystyrene (GPPS), impact-resistant polystyrene reinforced by rubber components (HIPS), styrene-butadiene copolymers, hydrogenated styrene-butadiene copolymers other than the hydrogenated block copolymer (a) used in the present embodiment, styrene-maleic acid anhydride copolymers, styrene-acrylonitrile copolymers, styrene-acrylonitrile-butadiene copolymers and styrene-methyl methacrylate copolymers. These copolymers may be random copolymers or block copolymers.

From the perspectives of liquid leakage resistance and needlestick resistance of a stopper for a medical container, it is preferable for the polyphenylene ether resin (c) to be used alone in the present embodiment. In such cases, it is preferable for the polyphenylene ether resin (c) to be in the form of a powder. The average particle diameter of the powdery polyphenylene ether resin (c) is preferably 100 to 500 μm, more preferably 120 to 450 μm, and further preferably 140 to 400 μm. The average particle diameter of the polyphenylene ether resin (c) can be measured using a laser diffraction type particle size distribution measurement apparatus using the method disclosed in the examples given below.

In the thermoplastic elastomer composition of the present embodiment, the content of the polyphenylene ether resin (c) is 5 to 100 parts by mass, preferably 10 to 90 parts by mass, and more preferably 15 to 85 parts by mass, relative to 100 parts by mass of the hydrogenated block copolymer (a). If the blending quantity of the polyphenylene ether resin (c) is less than 5 parts by mass, there are concerns that satisfactory compression set and rebound resilience cannot be achieved. If the blending quantity of the polyphenylene ether resin (c) exceeds 100 parts by mass, the molding processing properties of the thermoplastic elastomer composition tend to deteriorate.

<Non-Aromatic Softener (d)>

The non-aromatic softener (d) is not particularly limited as long as the softener does not exhibit aromatic properties and can soften the thermoplastic elastomer composition of the present embodiment, and examples thereof include paraffin-based oils, naphthene-based oils, paraffin waxes, liquid paraffin, white mineral oil and plant-based softeners. Of these, paraffin-based oils, liquid paraffin and white mineral oil are more preferred from perspectives such as low-temperature characteristics and dissolution resistance of the stopper for a medical container of the present embodiment.

The kinematic viscosity at 40° C. of the non-aromatic softener (d) is preferably not more than 500 mm$^2$/sec. The lower limit for the kinematic viscosity at 40° C. of the non-aromatic softener (d) is not particularly limited, but is preferably 10 mm$^2$/sec. If the kinematic viscosity at 40° C. of the non-aromatic softener (d) is not more than 500 mm$^2$/sec, the fluidity of the thermoplastic elastomer composition of the present embodiment tend to improve and molding processing properties tend to improve. The kinematic viscosity of the non-aromatic softener (d) can be measured by means of, for instance, a test method using a glass capillary viscometer.

In one embodiment of the present embodiment, a non-aromatic softener (d-1) having a kinematic viscosity at 40° C. of 300 to 400 mm$^2$/sec can be advantageously used as a non-aromatic softener (d). If the kinematic viscosity at 40° C. of the non-aromatic softener (d-1) falls within the range mentioned above, retention of the non-aromatic softener in the thermoplastic elastomer composition of the present embodiment (oil retention properties) tends to improve and balance between compression set and rebound resilience tends to improve.

In another embodiment, a non-aromatic softener (d-2) having a kinematic viscosity at 40° C. of not more than 100 mm$^2$/sec can be advantageously used as a non-aromatic softener (d). If the kinematic viscosity at 40° C. of the non-aromatic softener (d-2) is not more than 100 mm$^2$/sec, it tends to be possible to obtain a thermoplastic elastomer composition having excellent flexibility and rebound resilience while maintaining oil retention properties.

Furthermore, the non-aromatic softener (d) may be a combination of two or more kinds having different kinematic viscosity values at 40° C. For example, it is possible to use a combination of the non-aromatic softener (d-1) and the non-aromatic softener (d-2). By combining the non-aromatic softener (d-1) and the non-aromatic softener (d-2), not only can retention of the non-aromatic softener be improved, but the balance between softness, compression set and rebound resilience tends to be further improved.

In cases where the non-aromatic softener (d-1) and the non-aromatic softener (d-2) are combined, the mass ratio of the non-aromatic softener (d-1) and the non-aromatic softener (d-2) ((d-1)/(d-2)) is preferably from 30/70 to 60/40, more preferably from 35/75 to 60/40, and further preferably from 40/60 to 60/40. If the value of (d-1)/(d-2) falls within the range of from 30/70 to 60/40, flexibility and elasticity tend to be further improved, which is desirable.

The content of the non-aromatic softener (d) in the thermoplastic elastomer composition of the present embodiment is 50 to 200 parts by mass, preferably 80 to 180 parts by mass, and more preferably 90 to 170 parts by mass, relative to 100 parts by mass of the hydrogenated block copolymer (a). If the blending quantity of the non-aromatic softener (d) falls within the range mentioned above, not only can retention of the non-aromatic softener be further improved, but it also tends to be possible to obtain a thermoplastic elastomer composition having even better liquid leakage resistance, needlestick resistance and resealing properties.

Moreover, in cases where a combination of two or more non-aromatic softeners having different kinematic viscosities at 40° C. is used, the total content of the non-aromatic softener (d) (for example, the total content of the non-aromatic softener (d-1) and the non-aromatic softener (d-2)) is preferably 100 to 200 parts by mass, and more preferably 120 to 180 parts by mass relative to 100 parts by mass of the hydrogenated block copolymer (a). If the total content of the non-aromatic softener (d) falls within the range mentioned above, all of the characteristics of each of the two or more non-aromatic softeners tend to be satisfactorily exhibited. In the present embodiment, therefore, it is particularly preferable for the non-aromatic softener (d) to be a mixture of the non-aromatic softener (d-1) having a kinematic viscosity at 40° C. of 300-400 mm$^2$/sec and the non-aromatic softener (d-2) having a kinematic viscosity at 40° C. of not more than 100 mm$^2$/sec, wherein the mass ratio of the non-aromatic softener (d-1) and the non-aromatic softener (d-2) ((d-1)/(d-2)) is from 30/70 to 60/40, and the total content of the non-aromatic softener (d-1) and the non-aromatic softener (d-2) is 100 to 200 parts by mass relative to 100 parts by mass of the hydrogenated block copolymer (a).

<Carbon Black (e) and Inorganic Filler (f)>

From the perspectives of mechanical strength, rebound resilience and workability of the thermoplastic elastomer composition of the present embodiment, carbon black (e) and or an inorganic filler (f) may be contained in the composition.

The carbon black (e) is not particularly limited, and examples thereof include furnace black, thermal black and acetylene black.

The inorganic filler (f) is not particularly limited, and examples thereof include talc, calcium carbonate, zinc carbonate, wollastonite, zeolites, wollastonite, silica, alumina, clay, titanium oxide, magnesium oxide, sodium silicate, calcium silicate, magnesium silicate, sodium aluminate, calcium aluminate, sodium aluminosilicate, zinc oxide, potassium titanate, hydrotalcite, barium sulfate and titanium black.

In the thermoplastic elastomer composition of the present embodiment, the content of the carbon black (e) and/or inorganic filler (f) is preferably 3 to 100 parts by mass, more preferably 4 to 80 parts by mass, and further preferably κ to 60 parts by mass, relative to 100 parts by mass of the hydrogenated block copolymer (a).

<Organic Peroxide (g)>

From the perspectives of compression set and liquid leakage resistance, the thermoplastic elastomer composition of the present embodiment may be partially crosslinked in the presence of an organic peroxide (g).

Examples of organic peroxides include 2,5-dimethyl-2,5-di(t-butylperoxy)hexane, dicumyl peroxide, 2,5-dimethyl-2,5-di(benzoylperoxy)hexane, t-butylperoxybenzoate, t-butylcumyl peroxide, diisopropylbenzene hydroxyperoxide, 1,3-bis(t-butylperoxyisopropyl)benzene, benzoyl peroxide, 1,1-di(t-butylperoxy)-3,3,5-trimethylcyclohexane, t-butyl hydroperoxide, 1,1,3,3-tetra methylbutyl hydroperoxide, cumene hydroperoxide, di-t-butyl peroxide, 1,1-di-t-butylperoxycyclohexane, 2,5-dimethyl-2,5-di(t-butylperoxy) hexyne-3, n-butyl-4,4-bis(t-butylperoxy)valerate, t-butylperoxy isobutyrate, t-butylperoxy-2-ethylhexanoate and t-butylperoxyisopropyl carbonate, and these organic peroxides may be used singly, or in combination of two or more thereof. The usage quantity of the organic peroxide (g) used here is preferably 0.05 to 5 parts by mass, more preferably 0.1 to 4 parts by mass, and further preferably 0.3 to 3 parts by mass, relative to 100 parts by mass of the hydrogenated block copolymer (a). If the usage quantity of the organic peroxide (g) falls within the range mentioned above, it tends to be possible to obtain a thermoplastic elastomer composition having excellent compression set and liquid leakage resistance without losing workability.

<Auxiliary Crosslinking Agent (h)>

In addition, in cases where the thermoplastic elastomer composition of the present embodiment is partially crosslinked, it is possible to use an auxiliary crosslinking agent if necessary in order to adjust the degree of crosslinking.

Examples of auxiliary crosslinking agents include trimethylolpropane triacrylate, triallyl isocyanurate, triallyl cyanurate, triallylformal, triallyl trimellitate, N,N'-m-phenylene-bis-maleimide, dipropargyl terephthalate, diallylphthalate, tetraallyl terephthalamide, triallyl phosphate, divinylbenzene, ethylene dimethacrylate, diallyl phthalate, quinonedioxime, ethylene glycol dimethacrylate, polyfunctional methacrylate monomers, polyhydric alcohol methacrylates and acrylates and unsaturated silane compounds (for example, vinyltrimethoxysilane and vinyltriethoxysilane), and these auxiliary crosslinking agents may be used singly, or in combination of two or more thereof. The usage quantity of the auxiliary crosslinking agent (h) is preferably 0.1 to 10 parts by mass, more preferably 0.2 to 8 parts by mass, and further preferably 0.5 to 7 parts by mass, relative to 100 parts by mass of the hydrogenated block copolymer (a).

<Other Components>

The thermoplastic elastomer composition of the present embodiment may contain additives other than components (a) to (h) mentioned above as long as the objective of the present embodiment is not impaired. Examples of such additives include thermal stabilizers, antioxidants, ultraviolet radiation absorbers, anti-aging agents, plasticizers, photostabilizers, crystal nucleating agents, impact modifiers, pigments, lubricating agents, antistatic agents, flame retardants, flame retardant promoters, compatibilizers and tackifiers. These additives may be used singly, or in combination of two or more thereof.

<Thermoplastic Elastomer Composition>

It is preferable for the thermoplastic elastomer composition of the present embodiment to have a hardness of not more than 40 and a compression set of not more than 30%. If the hardness is not more than 40 and the compression set is not more than 30%, it tends to be possible to achieve satisfactory flexibility and strain recovery and needle piercing properties and liquid leakage resistance also tend to be excellent. From the same perspective, it is more preferable for the hardness to be not more than 38 and the compression set to be not more than 28%, and further preferable for the hardness to be not more than 36 and the compression set to be not more than 26%.

There are no particular lower limits, but it is preferable for the hardness to be not less than 20 and for the compression set to be not less than 0.01%.

<Method for Producing Thermoplastic Elastomer Composition>

The method for obtaining the thermoplastic elastomer composition of the present embodiment is not particularly limited, and a conventional known method can be used. For example, it is possible to use a melt kneading method that involves the use of an ordinary mixing machine, such as a pressurizing kneader, a Banbury mixer, an internal mixer, a Laboplast mill, a Mix-Labo, a single screw extruder, a twin screw extruder, a co-kneader or a multi-screw extruder, or a method in which the components are mixed by being dissolved or dispersed and the solvent is then removed by heating.

In cases where the thermoplastic elastomer composition of the present embodiment is partially crosslinked by the organic peroxide (g), it is possible to compound components (a) to (f) while simultaneously carrying out partial crosslinking using the organic peroxide (g) (and the auxiliary crosslinking agent (h), if necessary), and it is also possible to compound components (a) to (f), and then carry out partial crosslinking by adding the organic peroxide (g) and the auxiliary crosslinking agent (h), if necessary. In addition, it is also possible to mix some of components (a) to (f) with the organic peroxide (g) and the auxiliary crosslinking agent (h), if necessary, to carry out crosslinking, and then mix the remaining components.

The partial crosslinking can be carried out under temperature conditions at which the organic peroxide (g) being used undergoes decomposition, which is generally a temperature of 150° C. to 250° C.

In cases where some or all of components (a) to (f) are compounded while simultaneously carrying out crosslinking by means of the organic peroxide (g) (and the auxiliary crosslinking agent (h), if necessary), it is possible to carry out the compounding using a melt kneading device mentioned above at a temperature at which the organic peroxide (g) being used undergoes decomposition.

<Stopper for Medical Container, and Medical Container>

The stopper for a medical container of the present embodiment is provided with a sealing material comprising the thermoplastic elastomer composition of the present embodiment. In addition, the medical container of the present embodiment is provided with the stopper for a medical container of the present embodiment. The medical container of the present embodiment is not limited to those given below, but examples thereof include infusion solution bags, peritoneal dialysis bags, infusion solution bottles, infusion solution soft bottles, glass vials and plastic vials.

The shape of the sealing material in the present embodiment is not particularly limited, but examples thereof include truncated cones, cylinders and discs, and the diameter thereof is generally 5 to 25 mm. The thickness of the sealing material in the present embodiment (the thickness in the direction pierced by a injection needle) is not particularly limited, but is generally 2 to 10 mm.

<Method for Producing Stopper for Medical Container>

The method for producing the stopper for a medical container of the present embodiment is not particularly limited, but examples thereof include punching after injection molding, compression molding or extrusion molding.

EXAMPLES

The present embodiment will now be explained in detail through the use of specific examples and comparative examples, but the present embodiment is not limited to the examples given below. First, explanations will be given of the evaluation methods and methods for measuring physical properties used in the examples and comparative examples.

(Methods for Evaluating Hydrogenated Block Copolymer (a))

(1) Weight Average Molecular Weight, Number Average Molecular Weight and Molecular Weight Distribution Measurements were carried out using GPC (Apparatus: HL08220 manufactured by TOSOH CORPORATION, column: TSKgel SuperH-RC×2). Tetrahydrofuran was used as a solvent. Measurements were carried out at a temperature of 35° C. The weight average molecular weight and number average molecular weight were determined in terms of polystyrene by using a calibration curve prepared using a commercially available standard polystyrene whose weight average molecular weight and number average molecular weight were already known. In addition, the molecular weight distribution was determined as the ratio of the weight average molecular weight (Mw) and the number average molecular weight (Mn).

(2) Number Average Molecular Weight of Polymer Block A1'

In accordance with the method disclosed in I. M. KOLTHOFF, et al., J. Polym. Soi. 1,429 (1946), hydrogenated block copolymers (1) to (5) were oxidatively decomposed by t-butyl hydroperoxide using osmium tetroxide as a catalyst, and the number average molecular weight was determined in terms of polystyrene by carrying out GPC measurements in the same way as in the method described in (1) above.

(3) Total Content of Vinyl Aromatic Hydrocarbon Compound Monomer Units (Total Styrene Content)

The total content of vinyl aromatic hydrocarbon compound monomer units in hydrogenated block copolymers (1) to (12) was calculated from the absorption intensity at 262 nm using an ultraviolet radiation spectrophotometer (UV-2450 manufactured by Shimadzu Corporation).

(4) Vinyl Bond Content

Using block copolymers before hydrogenation (block copolymers (1) to (12) before hydrogenation), the vinyl bond content (1,2-bond content) was measured using a nuclear magnetic resonance apparatus (DPX-400 manufactured by BRUKER).

(5) Degree of Hydrogenation (Hydrogenation Rate)

Using hydrogenated block copolymers (1) to (12), the degree of hydrogenation was measured using a nuclear magnetic resonance apparatus (DPX-400 manufactured by BRUKER).

(Methods for Evaluating Polyphenylene Ether Resin (c))

(6) Reduced Viscosity

A 0.5 g/dL chloroform solution of the polyphenylene ether resin (c) was prepared, and the reduced viscosity (ηsp/c) [dig] was determined at 30° C. using an Ubbelohde type viscosity tube.

(7) Number Average Molecular Weight

Measurements were carried out using GPC (Apparatus: HL08220 manufactured by TOSOH CORPORATION, column: TSKgel Super H-RC×2). Chloroform was used as the solvent. Measurements were carried out at a temperature of 35° C. The number average molecular weight was determined in terms of polystyrene by using a calibration curve prepared using a commercially available standard polystyrene whose weight average molecular weight and number average molecular weight were already known.

(8) Average Particle Diameter of Polyphenylene Ether Resin (c)

The average particle diameter of the polyphenylene ether resin (c) was determined by dispersing the polyphenylene ether resin (c) in a 1-butanol solvent and carrying out measurements three or more times using a laser diffraction type particle size distribution measurement apparatus (LS-230 manufactured by Coulter), and the arithmetic mean value of the volume average median diameters was used as the average particle diameter.

(Production of Thermoplastic Elastomer Compositions)

Examples 1 to 12, Examples 16 to 25 and Comparative Examples 1 to 5

Based on the blending proportions (parts by mass) shown in Tables 1, 2, 4 and 5, thermoplastic elastomer composition pellets were obtained by melt kneading at a preset temperature of 270° C. using a twin screw extruder ("TEX-30αII" manufactured by Japan Steel Works, Ltd., cylinder opening diameter 30 mm).

Examples 13 to 15, 26 and 27

Based on the blending proportions (parts by mass) shown in Tables 3 and 6, thermoplastic elastomer composition pellets were obtained by melt kneading at a preset temperature of 270° C. using a twin screw extruder ("TEX-30αII" manufactured by Japan Steel Works, Ltd., cylinder opening diameter 30 mm).

Partially crosslinked thermoplastic elastomer composition pellets were obtained by adding component (g) and component (h) at the quantities (parts by mass) shown in Table 3 relative to 100 parts by mass of the obtained pellets, and carrying out a reaction at a temperature of 220° C.

(Methods for Evaluating Thermoplastic Elastomer Compositions)

(9) Melt Flow Rate (MFR)

The melt flow rate (MFR) of the thermoplastic elastomer composition pellets obtained in the manner described above was measured at a temperature of 230° C. under a load of 2.16 kg in accordance with ASTM D1238.

(Preparation of Pressed Sheets)

Pressed sheets having thicknesses of 2 mm were prepared using the thermoplastic elastomer composition pellets obtained above. Using the obtained pressed sheets, physical properties were measured in accordance with the measurement methods described below.

(Methods for Evaluating Pressed Sheets)

(10) Hardness

Measurements were carried out using a type A durometer in accordance with JIS K6253. If the shore A hardness was not more than 40, the sheet was judged as having sufficient flexibility.

(11) Tensile Stress, Tensile Strength at Break, and Elongation at Break

In accordance with JIS K6251, tensile tests were carried out under the conditions described below using a No. 3 type dumbbell at a cross head speed of 500 mm/min.

Tensile stress (M300): Tensile stress measured at an elongation of 300%.

Tensile strength at break (Tb): Stress measured upon breaking.

Elongation at break (Eb): Elongation measured upon breaking.

(12) Dunlop Rebound Resilience

In accordance with B5903, the Dunlop rebound resilience was measured at 23° C. using a Dunlop rebound resilience tester. If the Dunlop rebound resilience was not less than 40%, it was judged that elasticity was high and practicality was good.

(13) Compression Set

In accordance with JIS K6262, the residual strain rate was determined after 22 hours at 70° C. If the residual strain rate was not more than 30%, it was judged that sufficient deformation recovery had been exhibited.

(Production of Stopper for Medical Container)

Using the thermoplastic elastomer composition pellets obtained above, plates of 80 mm×120 mm×2 mm were formed using an injection molding machine ("IS-130t" manufactured by TOSHIBA MACHINE CO., LTD.), test pieces having diameters of 28 mm were punched out from the plates, and three test pieces were laminated to obtain a stopper. The injection molding conditions were as follows:

Resin temperature: 180° C. to 240° C., injection speed: 50 to 100 mm/sec, injection time: 2 to 20 seconds, mold temperature: 20° C. to 60° C., cooling time: 10 to 40 seconds.

(Methods for Evaluating Stopper for Medical Container)

(14) Needlestick Resistance

Using an Autograph, the maximum load was measured when a resin needle having a diameter of 3 mm pierced, at a speed of 500 mm/min, through a stopper obtained by laminating three test pieces having diameters of 28 mm. A lower maximum load means lower needlestick resistance, which is desirable.

(15) Needle Retention Force

A resin needle having a diameter of 3 mm was made to pierce through a stopper. Using an Autograph, the maximum load was measured when the needle that had been pierced through the stopper was removed at a speed of 500 mm/min. A higher maximum load means better needle retention force.

(16) Resealing Properties

A stopper obtained by laminating three test pieces having diameters of 28 mm was attached to the mouth of a bottle filled with 500 mL of water, and immobilized with a specialist jig. The stopper in the bottle was pierced with a resin needle having a diameter of 3 mm, then the bottle was turned upside down and allowed to stand for 2 hours. Next, the amount of liquid leaking out when the needle was removed was measured. A smaller amount of liquid leaking out means better resealing properties.

(17) Liquid Leakage Resistance

A stopper obtained by laminating 3 test pieces having diameters of 28 mm was attached to the mouth of a bottle filled with 500 mL of water, and immobilized with specialist jig. The stopper in the bottle was pierced with a resin needle having a diameter of 3 mm, then the bottle was pressurized to a pressure of 0.40 kgf/cm$^2$ with air, and the bottle was then turned upside down so that the mouth of the bottle was facing downwards and allowed to stand for 3 hours. The amount of liquid leaking from the spot at which the needle pierced the stopper was measured. A smaller quantity of liquid leaking under pressure means better liquid leakage resistance.

Explanations will now be given of the components used.

<Preparation of Hydrogenation Catalyst>

The hydrogenation catalyst used in the block copolymer hydrogenation reaction was prepared using the following method.

1 L of dried purified cyclohexane was placed in a nitrogen-purged reaction vessel, 100 mmol of biscyclopentadienyl titanium dichloride was added to the reaction vessel, an n-hexane solution comprising 200 mmol of trimethyl ammonium was added to the reaction vessel under vigorous stirring, and a reaction was allowed to progress for approximately 3 days at room temperature.

<Hydrogenated Block Copolymer (1)>

A tank type reactor having an internal volume of 10 L and fitted with a stirring device and a jacket was washed, dried and purged with nitrogen, then batch polymerization was carried out. First, a cyclohexane solution comprising 5 parts by mass of 1,3-butadiene monomer was placed in the reactor, then n-butyl lithium at a quantity of 0.04 parts by mass relative to 100 parts by mass of the total monomer and tetramethylethylenediamine (TMEDA) at a quantity of 0.55 moles relative to 1 mole of n-butyl lithium were added to the reactor, and polymerization was carried out for 30 minutes at 70° C. Next, a cyclohexane solution comprising 15 parts by mass of styrene monomer was added to the reactor and polymerization was carried out for 30 minutes at 70° C., after which a cyclohexane solution comprising 65 parts by mass of 1,3-butadiene monomer was added to the reactor and polymerization was carried out for 30 minutes at 70° C. Finally, a cyclohexane solution comprising 15 parts by mass of styrene monomer was added to the reactor and polymerization was carried out for 30 minutes at 70° C.

Next, the hydrogenation catalyst mentioned above was added to the obtained polymer at a quantity of 100 ppm in terms of titanium relative to 100 parts by mass of the polymer, and a hydrogenation reaction was carried out at a temperature of 65° C. and a hydrogen pressure of 0.7 MPa. Next, a hydrogenated block copolymer (1) was obtained by adding methanol and then adding octadecyl-3-(3,5-di-t-butyl-4-hydroxyphenyl)propionate as a stabilizer at a quantity of 0.3 parts by mass relative to 100 parts by mass of the polymer.

The obtained hydrogenated block copolymer (1) had a total styrene content of 30 mass %, a polystyrene block content of 29.7 mass %, a vinyl bond content before hydrogenation in polybutadiene blocks of 35 mass %, a weight average molecular weight of the total polymer of 206,000, a number average molecular weight of the polystyrene block having the highest number average molecular weight of 30,000, and a molecular weight distribution of 1.05. In addition, the degree of hydrogenation of aliphatic double bonds derived from 1,3-butadiene was 100%.

<Hydrogenated Block Copolymer (2)>

A tank type reactor having an internal volume of 10 L and fitted with a stirring device and a jacket was washed, dried and purged with nitrogen, then batch polymerization was carried out. First, a cyclohexane solution comprising 15 parts by mass of styrene monomer was placed in the reactor, then n-butyl lithium at a quantity of 0.04 parts by mass relative to 100 parts by mass of the total monomer and TMEDA at a quantity of 0.55 moles relative to 1 mole of n-butyl lithium were added to the reactor, and polymerization was carried out for 30 minutes at 70° C. Next, a cyclohexane solution comprising 70 parts by mass of 1,3-butadiene monomer was added to the reactor and polymerization was carried out for 30 minutes at 70° C. Finally, a cyclohexane solution comprising 15 parts by mass of styrene monomer was added to the reactor and polymerization was carried out for 30 minutes at 70° C.

Next, the hydrogenation catalyst mentioned above was added to the obtained polymer at a quantity of 100 ppm in terms of titanium relative to 100 parts by mass of the polymer, and a hydrogenation reaction was carried out at a temperature of 65° C. and a hydrogen pressure of 0.7 MPa. Next, a hydrogenated block copolymer (2) was obtained by adding methanol and then adding octadecyl-3-(3,5-di-t-butyl-4-hydroxyphenyl)propionate as a stabilizer at a quantity of 0.3 parts by mass relative to 100 parts by mass of the polymer.

The obtained hydrogenated block copolymer (2) had a total styrene content of 30 mass %, a polystyrene block content of 29.7 mass %, a vinyl bond content before hydrogenation in polybutadiene blocks of 35 mass %, a weight average molecular weight of the total polymer of 212,000, a number average molecular weight of the polystyrene block having the highest number average molecular weight of 23,000, and a molecular weight distribution of 1.05. In addition, the degree of hydrogenation of aliphatic double bonds derived from 1,3-butadiene in the hydrogenated block copolymer (2) was 100%.

<Hydrogenated Block Copolymer (3)>

A tank type reactor having an internal volume of 10 L and fitted with a stirring device and a jacket was washed, dried and purged with nitrogen, then batch polymerization was carried out. First, a cyclohexane solution comprising 15 parts by mass of styrene monomer was placed in the reactor, then n-butyl lithium at a quantity of 0.04 parts by mass relative to 100 parts by mass of the total monomer and TMEDA at a quantity of 0.55 moles relative to 1 mole of n-butyl lithium were added to the reactor, and polymerization was carried out for 30 minutes at 70° C. Next, a cyclohexane solution comprising 70 parts by mass of 1,3-butadiene monomer was added to the reactor and polymerization was carried out for 30 minutes at 70° C. Finally, a cyclohexane solution comprising 15 parts by mass of styrene monomer was added to the reactor and polymerization was carried out for 30 minutes at 70° C.

Next, the hydrogenation catalyst mentioned above was added to the obtained polymer at a quantity of 100 ppm in terms of titanium relative to 100 parts by mass of the polymer, and a hydrogenation reaction was carried out at a temperature of 65° C. and a hydrogen pressure of 0.7 MPa. Next, a hydrogenated block copolymer (3) was obtained by adding methanol and then adding octadecyl-3-(3,5-di-t-butyl-4-hydroxyphenyl)propionate as a stabilizer at a quantity of 0.3 parts by mass relative to 100 parts by mass of the polymer.

The obtained hydrogenated block copolymer (3) had a total styrene content of 30 mass %, a polystyrene block content of 29.7 mass %, a vinyl bond content before hydrogenation in polybutadiene blocks of 35 mass %, a weight average molecular weight pf the total polymer of 212,000, a number average molecular weight of the polystyrene block having the highest number average molecular weight of 23,000, and a molecular weight distribution of 1.04. In addition, the degree of hydrogenation of aliphatic double bonds derived from 1,3-butadiene in the hydrogenated block copolymer (3) was 80%.

<Hydrogenated Block Copolymer (4)>

A tank type reactor having an internal volume of 10 L and fitted with a stirring device and a jacket was washed, dried and purged with nitrogen, after which batch polymerization was carried out. First, a cyclohexane solution comprising 15 parts by mass of styrene monomer was placed in the reactor, then n-butyl lithium at a quantity of 0.025 parts by mass relative to 100 parts by mass of the total monomer and TMEDA at a quantity of 0.55 moles relative to 1 mole of n-butyl lithium were added to the reactor, and polymerization was carried out for 30 minutes at 70° C. Next, a cyclohexane solution comprising 70 parts by mass of 1,3-butadiene monomer was added to the reactor and polymerization was carried out for 30 minutes at 70° C. Finally, a cyclohexane solution comprising 15 parts by mass of styrene monomer was added to the reactor and polymerization was carried out for 30 minutes at 70° C.

Next, the hydrogenation catalyst mentioned above was added to the obtained polymer at a quantity of 100 ppm in terms of titanium relative to 100 parts by mass of the polymer, and a hydrogenation reaction was carried out at a temperature of 65° C. and a hydrogen pressure of 0.7 MPa. Next, a hydrogenated block copolymer (4) was obtained by adding methanol and then adding octadecyl-3-(3,5-di-t-butyl-4-hydroxyphenyl)propionate as a stabilizer at a quantity of 0.3 parts by mass relative to 100 parts by mass of the polymer.

The obtained hydrogenated block copolymer (4) had a total styrene content of 30 mass %, a polystyrene block content of 29.7 mass %, a vinyl bond content before hydrogenation in polybutadiene blocks of 35 mass %, a weight average molecular weight of the total polymer of 366,000, a number average molecular weight of the polystyrene block having the highest number average molecular weight of 54,000, and a molecular weight distribution of 1.05. In addition, the degree of hydrogenation of aliphatic double bonds derived from 1,3-butadiene in the hydrogenated block copolymer (4) was 100%.

<Hydrogenated Block Copolymer (5)>

A tank type reactor having an internal volume of 10 L and fitted with a stirring device and a jacket was washed, dried and purged with nitrogen, after which batch polymerization was carried out. First, a cyclohexane solution comprising 7 parts by mass of styrene monomer was placed in the reactor, then n-butyl lithium at a quantity of 0.06 parts by mass relative to 100 parts by mass of the total monomer and TMEDA at a quantity of 0.10 moles relative to 1 mole of n-butyl lithium were added to the reactor, and polymerization was carried out for 30 minutes at 70° C. Next, a cyclohexane solution comprising 86 parts by mass of 1,3-butadiene monomer was added to the reactor and polymerization was carried out for 30 minutes at 70° C. Finally, a cyclohexane solution comprising 7 parts by mass of styrene monomer was added to the reactor and polymerization was carried out for 30 minutes at 70° C.

Next, the hydrogenation catalyst mentioned above was added to the obtained polymer at a quantity of 100 ppm in terms of titanium relative to 100 parts by mass of the polymer, and a hydrogenation reaction was carried out at a temperature of 65° C. and a hydrogen pressure of 0.7 MPa. Next, a hydrogenated block copolymer (5) was obtained by adding methanol and then adding octadecyl-3-(3,5-di-t-butyl-4-hydroxyphenyl)propionate as a stabilizer at a quantity of 0.3 parts by mass relative to 100 parts by mass of the polymer.

The obtained hydrogenated block copolymer (5) had a total styrene content of 14 mass %, a polystyrene block content of 13.7 mass %, a vinyl bond content before hydrogenation in polybutadiene blocks of 72 mass %, a weight average molecular weight of the total polymer of 138,000, a number average molecular weight of the polystyrene block having the highest number average molecular weight of 9,400, and a molecular weight distribution of 1.11. In addition, the degree of hydrogenation of aliphatic double bonds derived from 1,3-butadiene in the hydrogenated block copolymer (5) was 100%.

<Hydrogenated Block Copolymer (6)>

A tank type reactor having an internal volume of 10 L and fitted with a stirring device and a jacket was washed, dried and purged with nitrogen, after which batch polymerization was carried out. First, a cyclohexane solution comprising 10 parts by mass of styrene monomer was placed in the reactor, then n-butyl lithium at a quantity of 0.115 parts by mass relative to 100 parts by mass of the total monomer and TMEDA at a quantity of 0.45 moles relative to 1 mole of n-butyl lithium were added to the reactor, and polymerization was carried out for 30 minutes at 70° C. Next, a cyclohexane solution comprising 80 parts by mass of 1,3-butadiene monomer was added to the reactor and polymerization was carried out for 30 minutes at 70° C. Finally, a cyclohexane solution comprising 10 parts by mass of styrene monomer was added to the reactor and polymerization was carried out for 30 minutes at 70° C.

When polymerizing the butadiene monomer, the peak temperature in the reactor was controlled to 78° C. Furthermore, the difference between the maximum and minimum temperatures in the reactor while polymerizing the butadiene monomer (the temperature range ($\Delta T$)) was controlled to 8° C.

The peak temperature in the reactor and the temperature range (ΔT) were controlled within prescribed ranges by means of a method of carrying out cooling in order to eliminate reaction heat, a method of reducing the concentration of butadiene monomer units in the reaction system, a method of lowering the speed of supply of butadiene monomer units, or a combination of these methods.

Next, the hydrogenation catalyst mentioned above was added to the obtained polymer at a quantity of 100 ppm in terms of titanium relative to 100 parts by mass of the polymer, and a hydrogenation reaction was carried out at a temperature of 65° C. and a hydrogen pressure of 0.7 MPa. Next, a hydrogenated block copolymer (6) was obtained by adding methanol and then adding octadecyl-3-(3,5-di-t-butyl-4-hydroxyphenyl)propionate as a stabilizer at a quantity of 0.3 parts by mass relative to 100 parts by mass of the polymer.

The obtained hydrogenated block copolymer (6) had a total styrene content of 20 mass %, a vinyl bond content before hydrogenation in polybutadiene blocks of 52 mass %, a heat of crystal fusion (ΔH) of 0.02 J/g, a weight average molecular weight of the total polymer of 92,000, a molecular weight distribution of 1.04 and a degree of hydrogenation of 99%.

<Hydrogenated Block Copolymer (7)>

A hydrogenated block copolymer (7) was obtained in the same way as hydrogenated block copolymer (6), except that the quantity of n-butyl lithium was changed to 0.17 parts by mass relative to 100 parts by mass of the total monomer quantity. The obtained hydrogenated block copolymer (7) had a total styrene content of 20 mass %, a vinyl bond content before hydrogenation in polybutadiene blocks of 51 mass %, a heat of crystal fusion (ΔH) of 0.04 J/g, a weight average molecular weight of the total polymer of 65,000, a molecular weight distribution of 1.05 and a degree of hydrogenation of 99%.

<Hydrogenated Block Copolymer (8)>

A hydrogenated block copolymer (8) was obtained in the same way as hydrogenated block copolymer (6), except that the quantity of n-butyl lithium was changed to 0.09 parts by mass relative to 100 parts by mass of the total monomer quantity. The obtained hydrogenated block copolymer (8) had a total styrene content of 20 mass %, a vinyl bond content before hydrogenation in polybutadiene blocks of 51 mass %, a heat of crystal fusion (ΔH) of 0.03 J/g, a weight average molecular weight of the total polymer of 112,000, a molecular weight distribution of 1.04 and a degree of hydrogenation of 99%.

<Hydrogenated Block Copolymer (9)>

A hydrogenated block copolymer (9) was obtained in the same way as hydrogenated block copolymer (6), except that the quantity of n-butyl lithium was changed to 0.07 parts by mass relative to 100 parts by mass of the total monomer quantity. The obtained hydrogenated block copolymer (9) had a total styrene content of 20 mass %, a vinyl bond content before hydrogenation in polybutadiene blocks of 52 mass %, a heat of crystal fusion (ΔH) of 0.02 J/g, a weight average molecular weight of the total polymer of 151,000, a molecular weight distribution of 1.04 and a degree of hydrogenation of 99%.

<Hydrogenated Block Copolymer (10)>

A hydrogenated block copolymer (10) was obtained in the same way as hydrogenated block copolymer (6), except that the peak temperature in the reactor in polymerizing the butadiene monomer was controlled to 95° C. and the temperature range (ΔT) in the reactor while polymerizing the butadiene monomer was controlled to 18° C.

The obtained hydrogenated block copolymer (10) had a total styrene content of 20 mass %, a vinyl bond content before hydrogenation in polybutadiene blocks of 51 mass %, a heat of crystal fusion (ΔH) of 0.25 J/g, a weight average molecular weight of the total polymer of 92,000, a molecular weight distribution of 1.04 and a degree of hydrogenation of 99%.

<Hydrogenated Block Copolymer (11)>

A hydrogenated block copolymer (11) was obtained in the same way as hydrogenated block copolymer (6), except that the peak temperature in the reactor in polymerizing the butadiene monomer was controlled to 95° C. and the temperature range (ΔT) in the reactor while polymerizing the butadiene monomer was controlled to 45° C.

The obtained hydrogenated block copolymer (11) had a total styrene content of 20 mass %, a vinyl bond content before hydrogenation in polybutadiene blocks of 52 mass %, a heat of crystal fusion (ΔH) of 0.71 J/g, a weight average molecular weight of the total polymer of 91,000, a molecular weight distribution of 1.04 and a degree of hydrogenation of 99%.

<Hydrogenated Block Copolymer (12)>

A hydrogenated block copolymer (12) was obtained in the same way as hydrogenated block copolymer (6), except that the quantity of n-butyl lithium was changed to 0.115 parts by mass relative to 100 parts by mass of the total monomer quantity and the quantity of TMEDA was changed to 0.80 moles relative to 1 mole of n-butyl lithium.

The obtained hydrogenated block copolymer (12) had a total styrene content of 20 mass %, a vinyl bond content before hydrogenation in polybutadiene blocks of 65 mass %, a heat of crystal fusion (ΔH) of 0.01 J/g, a weight average molecular weight of the total polymer of 92,000, a molecular weight distribution of 1.05 and a degree of hydrogenation of 99%.

<Polypropylene-Based Resin (b)>

The following commercially available product was used as the polypropylene-based resin (b).

Polypropylene-based resin (b): Novatec MA3Q manufactured by Japan Polypropylene Corporation, propylene homopolymer, MFR (230° C., 2.16 kg): 10 g/10 min <Polyphenylene Ether Resin (c)>

The polyphenylene ether resin (c) was prepared by the following method. The polyphenylene ether resin (c) was prepared by obtaining a polyphenylene ether by means of oxidative coupling polymerization of 2,6-dimethylphenol in accordance with a known method, and then purifying it. The obtained polyphenylene ether resin (c) had a reduced viscosity (measured at 30° C. in a 0.5 g/dL chloroform solution) of 0.44, a number average molecular weight of 17,000 and an average particle diameter of 280 μm.

<Non-Aromatic Softener (d)>

The following commercially available products were used as the non-aromatic softener (d).

Non-aromatic softener (d-1): Diana Process Oil PW 380 manufactured by Idemitsu Kosan Co., Ltd., paraffin-based oil, weight average molecular weight 750, kinematic viscosity (40° C.)=380 mm²/sec Non-aromatic softener (d-2): Diana Process Oil PW 90 manufactured by Idemitsu Kosan Co., Ltd., paraffin-based oil, weight average molecular weight 530, kinematic viscosity (40° C.)=90.5 mm²/sec <Carbon Black (e)>

The following commercially available product was used as the carbon black (e).

Carbon black (e): DENKA BLACK (particulate) manufactured by Denka Company Limited, acetylene black <Inorganic Filler (f)>
The following commercially available product was used as the inorganic filler (f).
Inorganic filler (f): TIPAQUE CR-50 manufactured by ISHIHARA SANGYO KAISHA, LTD., titanium oxide
<Organic Peroxide (g)>
The following commercially available product was used as the organic peroxide (g).
Organic peroxide (g): PERHEXA 25B manufactured by NOF CORPORATION, 2,5-dimethyl-2,5-di(t-butylperoxy) hexane
<Auxiliary Crosslinking Agent (h)>
The following commercially available product was used as the auxiliary crosslinking agent (h).
Auxiliary crosslinking agent (h): TAIC WH-60 manufactured by Nippon Kasei Chemical Co., Ltd., triallyl isocyanurate

TABLE 3

|  | Example 13 | Example 14 | Example 15 |
|---|---|---|---|
| Hydrogenated block copolymer (1) |  |  |  |
| Hydrogenated block copolymer (2) |  |  |  |
| Hydrogenated block copolymer (3) | 100 | 100 | 100 |
| Hydrogenated block copolymer (4) |  |  |  |
| Hydrogenated block copolymer (5) |  |  |  |
| Polypropylene-based resin (b) | 30 | 30 | 30 |
| Polyphenylene ether resin (c) | 30 | 30 | 30 |
| Non-aromatic rubber softener (d-1) | 150 | 150 |  |
| Non-aromatic rubber softener (d-2) |  |  | 150 |
| Organic peroxide (g) | 1 | 2 | 1 |
| Auxiliary crosslinking agent (h) | 2 | 4 | 2 |
| MFR (230° C., 2.16 kg) [g/10 min] | 0.8 | 0.6 | 2.5 |
| Hardness [—] | 39 | 40 | 38 |
| M300 [MPa] | 2.5 | 3.1 | 2.3 |

TABLE 1

|  | Example 1 | Example 2 | Example 3 | Example 4 | Example 5 | Example 6 | Comparative Example 1 |
|---|---|---|---|---|---|---|---|
| Hydrogenated block copolymer (1) | 100 |  |  |  |  | 100 |  |
| Hydrogenated block copolymer (2) |  | 100 |  |  |  |  |  |
| Hydrogenated block copolymer (3) |  |  | 100 | 100 |  |  |  |
| Hydrogenated block copolymer (4) |  |  |  |  |  |  | 100 |
| Hydrogenated block copolymer (5) |  |  |  |  | 100 |  |  |
| Polypropylene-based resin (b) | 30 | 30 | 30 | 30 | 30 | 30 | 30 |
| Polyphenylene ether resin (c) | 30 | 30 | 30 | 30 | 30 | 30 | 30 |
| Non-aromatic rubber softener (d-1) | 150 | 150 | 150 |  | 150 | 120 | 150 |
| Non-aromatic rubber softener (d-2) |  |  |  | 150 |  |  |  |
| MFR (230° C., 2.16 kg) [g/10 min] | 1.7 | 1.6 | 1.6 | 1.7 | 2.4 | 2.1 | 0.3 |
| Hardness [—] | 38 | 40 | 39 | 36 | 34 | 40 | 48 |
| M300 [MPa] | 2.2 | 2.5 | 2.3 | 2.1 | 1.8 | 2.2 | 3.4 |
| Tb [MPa] | 10.5 | 11.1 | 10.7 | 8.9 | 7.9 | 9.4 | 16.9 |
| Eb [%] | 680 | 630 | 690 | 640 | 790 | 630 | 540 |
| Dunlop rebound resilience [%] | 42 | 48 | 45 | 48 | 40 | 38 | 48 |
| Compression set [%] | 23 | 21 | 22 | 26 | 29 | 35 | 20 |
| Needlestick resistance [N] | 169 | 186 | 164 | 143 | 121 | 182 | 258 |
| Needle retention force [N] | 29 | 27 | 21 | 13 | 10 | 24 | 55 |
| Resealing properties [ml] | 0 | 0 | 0 | 0.05 | 0.05 | 0.08 | 0 |
| Liquid leakage resistance (under pressure) [ml] | 0.08 | 0.05 | 0.04 | 0.10 | 0.15 | 0.26 | 0.26 |

TABLE 2

|  | Example 7 | Example 8 | Example 9 | Example 10 | Example 11 | Example 12 | Comparative Example 2 |
|---|---|---|---|---|---|---|---|
| Hydrogenated block copolymer (1) | 100 | 100 | 100 | 100 | 100 | 100 | 100 |
| Hydrogenated block copolymer (2) |  |  |  |  |  |  |  |
| Hydrogenated block copolymer (3) |  |  |  |  |  |  |  |
| Hydrogenated block copolymer (4) |  |  |  |  |  |  |  |
| Hydrogenated block copolymer (5) |  |  |  |  |  |  |  |
| Polypropylene-based resin (b) | 5 | 15 | 30 | 30 | 30 | 30 | 15 |
| Polyphenylene ether resin (c) | 30 | 30 | 30 | 30 | 30 | 30 |  |
| Non-aromatic rubber softener (d-1) |  |  |  |  | 90 | 60 |  |
| Non-aromatic rubber softener (d-2) | 150 | 150 | 120 | 120 | 60 | 90 | 150 |
| Carbon black (e) |  |  |  | 5 |  |  |  |
| Inorganic filler (f) |  |  |  | 5 |  |  |  |
| MFR (230° C., 2.16 kg) [g/10 min] | 0.7 | 2.3 | 4.9 | 4.3 | 3.6 | 4.3 | 2.1 |
| Hardness [—] | 15 | 21 | 34 | 40 | 37 | 36 | 20 |
| M300 [MPa] | 0.4 | 0.7 | 1.7 | 1.8 | 2.2 | 2.1 | 0.2 |
| Tb [MPa] | 8.9 | 8.3 | 8.1 | 8.7 | 9.3 | 8.9 | 5.2 |
| Eb [%] | 750 | 720 | 670 | 720 | 650 | 680 | 790 |
| Dunlop rebound resilience [%] | 47 | 43 | 41 | 42 | 46 | 45 | 35 |
| Compression set [%] | 24 | 27 | 30 | 29 | 25 | 26 | 53 |
| Needlestick resistance [N] | 145 | 153 | 164 | 162 | 166 | 158 | 208 |
| Needle retention force [N] | 19 | 24 | 28 | 31 | 25 | 23 | 9 |
| Resealing properties [ml] | 0 | 0 | 0.05 | 0.04 | 0 | 0 | 0.59 |
| Liquid leakage resistance (under pressure) [ml] | 0.06 | 0.11 | 0.16 | 0.15 | 0.09 | 0.10 | 0.73 |

TABLE 3-continued

|  | Example 13 | Example 14 | Example 15 |
|---|---|---|---|
| Tb [MPa] | 7.6 | 7.9 | 7.2 |
| Eb [%] | 590 | 460 | 580 |
| Dunlop rebound resilience [%] | 53 | 59 | 55 |
| Compression set [%] | 22 | 18 | 22 |
| Needlestick resistance [N] | 151 | 143 | 154 |
| Needle retention force [N] | 26 | 23 | 22 |
| Resealing properties [ml] | 0 | 0 | 0 |
| Liquid leakage resistance (under pressure) [ml] | 0.02 | 0 | 0.05 |

TABLE 4

|  | Example 16 | Example 17 | Example 18 | Example 19 | Comparative Example 3 | Comparative Example 4 |
|---|---|---|---|---|---|---|
| Hydrogenated block copolymer (1) | 80 |  | 80 | 80 |  | 60 |
| Hydrogenated block copolymer (2) |  | 80 |  |  |  |  |
| Hydrogenated block copolymer (3) |  |  |  |  |  |  |
| Hydrogenated block copolymer (4) |  |  |  |  | 80 |  |
| Hydrogenated block copolymer (6) | 20 | 20 | 20 | 20 | 20 | 40 |
| Hydrogenated block copolymer (7) |  |  |  |  |  |  |
| Hydrogenated block copolymer (8) |  |  |  |  |  |  |
| Hydrogenated block copolymer (9) |  |  |  |  |  |  |
| Hydrogenated block copolymer (10) |  |  |  |  |  |  |
| Hydrogenated block copolymer (11) |  |  |  |  |  |  |
| Hydrogenated block copolymer (12) |  |  |  |  |  |  |
| Polypropylene-based resin (b) | 30 | 30 | 30 | 30 | 30 | 30 |
| Polyphenylene ether resin (c) | 30 | 30 | 30 | 30 | 30 | 30 |
| Non-aromatic rubber softener (d-1) | 120 | 120 |  | 54 | 120 | 120 |
| Non-aromatic rubber softener (d-2) |  |  | 120 | 66 |  |  |
| MFR (230° C., 2.16 kg) [g/10 min] | 2.4 | 1.9 | 3.9 | 2.6 | 0.4 | 2.7 |
| Hardness [—] | 33 | 35 | 30 | 31 | 46 | 30 |
| M300 [MPa] | 2.0 | 2.2 | 1.7 | 1.7 | 2.8 | 1.6 |
| Tb [MPa] | 11.5 | 11.6 | 9.1 | 8.8 | 12.9 | 8.7 |
| Eb [%] | 740 | 700 | 760 | 710 | 600 | 680 |
| Dunlop rebound resilience [%] | 58 | 55 | 61 | 60 | 50 | 48 |
| Compression set [%] | 28 | 26 | 30 | 28 | 24 | 40 |
| Needlestick resistance [N] | 164 | 183 | 155 | 160 | 250 | 143 |
| Needle retention force [N] | 24 | 23 | 21 | 22 | 49 | 17 |
| Resealing properties [ml] | 0 | 0 | 0 | 0 | 0 | 0.15 |
| Liquid leakage resistance (under pressure) [ml] | 0.03 | 0.02 | 0.05 | 0.03 | 0.21 | 0.59 |

TABLE 5

|  | Example 20 | Example 21 | Example 22 | Example 23 | Example 24 | Comparative Example 5 |
|---|---|---|---|---|---|---|
| Hydrogenated block copolymer (1) | 80 | 80 | 80 | 80 | 80 | 80 |
| Hydrogenated block copolymer (2) |  |  |  |  |  |  |
| Hydrogenated block copolymer (3) |  |  |  |  |  |  |
| Hydrogenated block copolymer (4) |  |  |  |  |  |  |
| Hydrogenated block copolymer (6) |  |  |  |  |  |  |
| Hydrogenated block copolymer (7) | 20 |  |  |  |  |  |
| Hydrogenated block copolymer (8) |  | 20 |  |  |  |  |
| Hydrogenated block copolymer (9) |  |  |  |  |  | 20 |
| Hydrogenated block copolymer (10) |  |  | 20 |  |  |  |
| Hydrogenated block copolymer (11) |  |  |  | 20 |  |  |
| Hydrogenated block copolymer (12) |  |  |  |  | 20 |  |
| Polypropylene-based resin (b) | 30 | 30 | 30 | 30 | 30 | 30 |
| Polyphenylene ether resin (c) | 30 | 30 | 30 | 30 | 30 | 30 |
| Non-aromatic rubber softener (d-1) | 120 | — | — | — | — | — |
| Non-aromatic rubber softener (d-2) | — | 120 | 120 | 120 | 120 | 120 |
| MFR (230° C., 2.16 kg) [g/10 min] | 18.2 | 1.7 | 3.9 | 3.7 | 4.5 | 2.1 |
| Hardness [—] | 24 | 36 | 35 | 37 | 29 | 41 |
| M300 [MPa] | 1.1 | 1.5 | 1.6 | 1.4 | 1.2 | 2.2 |
| Tb [MPa] | 7.8 | 10.3 | 11.1 | 10.6 | 6.5 | 10.9 |
| Eb [%] | 730 | 630 | 700 | 680 | 750 | 590 |
| Dunlop rebound resilience [%] | 52 | 50 | 55 | 45 | 46 | 44 |
| Compression set [%] | 30 | 26 | 29 | 35 | 32 | 26 |
| Needlestick resistance [N] | 145 | 191 | 174 | 185 | 138 | 204 |
| Needle retention force [N] | 21 | 26 | 31 | 21 | 21 | 23 |
| Resealing properties [ml] | 0.02 | 0.05 | 0 | 0.06 | 0.07 | 0.09 |
| Liquid leakage resistance (under pressure) [ml] | 0.10 | 0.06 | 0.06 | 0.11 | 0.21 | 0.38 |

TABLE 6

|  | Example 25 | Example 26 | Example 27 |
|---|---|---|---|
| Hydrogenated block copolymer (1) |  |  |  |
| Hydrogenated block copolymer (2) |  |  |  |
| Hydrogenated block copolymer (3) | 80 | 80 | 80 |
| Hydrogenated block copolymer (4) |  |  |  |
| Hydrogenated block copolymer (6) | 20 | 20 | 20 |
| Hydrogenated block copolymer (7) |  |  |  |
| Hydrogenated block copolymer (8) |  |  |  |
| Hydrogenated block copolymer (9) |  |  |  |
| Hydrogenated block copolymer (10) |  |  |  |
| Hydrogenated block copolymer (11) |  |  |  |
| Hydrogenated block copolymer (12) |  |  |  |
| Polypropylene-based resin (b) | 30 | 30 | 30 |
| Polyphenylene ether resin (c) | 30 | 30 | 30 |
| Non-aromatic rubber softener (d-1) |  |  |  |
| Non-aromatic rubber softener (d-2) | 120 | 120 | 120 |
| Organic peroxide (g) |  | 1 | 2 |
| Auxiliary crosslinking agent (h) |  | 1.5 | 3 |
| MFR (230° C., 2.16 kg) [g/10 min] | 4.6 | 2.2 | 1.5 |
| Hardness [—] | 32 | 35 | 38 |
| M300 [MPa] | 2 | 2.2 | 1.8 |
| Tb [MPa] | 8.9 | 8.1 | 7.6 |
| Eb [%] | 710 | 670 | 630 |
| Dunlop rebound resilience [%] | 55 | 58 | 60 |
| Compression set [%] | 28 | 25 | 22 |
| Needlestick resistance [N] | 160 | 154 | 150 |
| Needle retention force [N] | 24 | 36 | 48 |
| Resealing properties [ml] | 0.03 | 0.01 | 0 |
| Liquid leakage resistance (under pressure) [ml] | 0.08 | 0.04 | 0.01 |

The present application is based on Japanese patent applications filed with the Japan Patent Office on Apr. 16, 2014 or Oct. 17, 2014 (Japanese Patent Applications Nos. 2014-084726, 2014-084722, 2014-212323 and 2014-212324), and the contents of which are incorporated herein by reference.

INDUSTRIAL APPLICABILITY

The thermoplastic elastomer composition of the present invention and a stopper for a medical container that uses this thermoplastic elastomer composition exhibit excellent balance between needlestick resistance, liquid leakage resistance, and the like. Furthermore, the thermoplastic elastomer composition of the present invention is superior in workability, moldability and hygiene to vulcanized rubbers, and is therefore expected to be used for stoppers for a variety of medical containers, such as infusion solution bags.

The invention claimed is:

1. A thermoplastic elastomer composition comprising:
100 parts by mass of a hydrogenated block copolymer (a);
from 3 to 50 parts by mass of a polypropylene-based resin (b);
from 5 to 100 parts by mass of a polyphenylene ether resin (c); and
from 50 to 200 parts by mass of a non-aromatic softener (d),
wherein
the hydrogenated block copolymer (a) comprises:
a hydrogenated block copolymer (a-1') that is able to be formed by hydrogenating a block copolymer that comprises at least one polymer block A1 comprising a vinyl aromatic hydrocarbon compound monomer unit as a primary component and at least one polymer block B1 comprising a conjugated diene compound monomer unit as a primary component; and
a hydrogenated block copolymer (a-2) that is able to be formed by hydrogenating a block copolymer that comprises at least one polymer block A2 comprising a vinyl aromatic hydrocarbon compound monomer unit as a primary component and at least one polymer block B2 comprising a conjugated diene compound monomer unit as a primary component,
a weight average molecular weight of the hydrogenated block copolymer (a-1') is from 140,000 to 350,000,
a weight average molecular weight of the hydrogenated block copolymer (a-2) is from 50,000 to 120,000, and
a mass ratio ((a-1')/(a-2)) of the hydrogenated block copolymer (a-1') and the hydrogenated block copolymer (a-2) is from 70/30 to 95/5.

2. The thermoplastic elastomer composition according to claim 1, wherein a total content of vinyl aromatic hydrocarbon compound monomer units in the hydrogenated block copolymer (a-2) is from 10 to 25 mass %.

3. The thermoplastic elastomer composition according to claim 1, wherein a vinyl bond content before hydrogenation in the conjugated diene compound monomer units in the hydrogenated block copolymer (a-2) is from 40 to 60 mol. %.

4. The thermoplastic elastomer composition according to claim 1, wherein heat of crystal fusion (ΔH) of the hydrogenated block copolymer (a-2) is less than 0.5 J/g.

5. The thermoplastic elastomer composition according to claim 1, wherein a total content of vinyl aromatic hydrocarbon compound monomer units in the hydrogenated block copolymer (a-1') is from 26 to 70 mass %.

6. The thermoplastic elastomer composition according to claim 1, wherein a vinyl bond content before hydrogenation in the conjugated diene compound monomer units in the hydrogenated block copolymer (a-1') is from 30 to 60 mol. %.

7. The thermoplastic elastomer composition according to claim 1, wherein
the hydrogenated block copolymer (a-1') has at least two polymer blocks A1 and at least two polymer blocks B1, and
at least one of the polymer blocks B1 is located at a polymer end and a content of said polymer block B1 located at a polymer end is from 0.5 to 9 mass %.

8. The thermoplastic elastomer composition according to claim 1, wherein a reduced viscosity of the polyphenylene ether resin (c) is from 0.15 to 0.70 dL/g.

9. The thermoplastic elastomer composition according to claim 1, wherein the non-aromatic softener (d) is a non-aromatic softener (d-1) having a kinematic viscosity at 40° C. of from 300 to 400 mm²/sec.

10. The thermoplastic elastomer composition according to claim 1, wherein the non-aromatic softener (d) is a non-aromatic softener (d-2) having a kinematic viscosity at 40° C. of 100 mm²/sec or less.

11. The thermoplastic elastomer composition according to claim 1, wherein
the non-aromatic softener (d) is a mixture of a non-aromatic softener (d-1) having a kinematic viscosity at 40° C. of from 300 to 400 mm²/sec and a non-aromatic softener (d-2) having a kinematic viscosity at 40° C. of 100 mm²/sec or less,
a mass ratio ((d-1)/(d-2)) of the non-aromatic softener (d-1) and the non-aromatic softener (d-2) is from 30/70 to 60/40, and
a total content of the non-aromatic softener (d-1) and the non-aromatic softener (d-2) is from 100 to 200 parts by mass relative to 100 parts by mass of the hydrogenated block copolymer (a).

12. The thermoplastic elastomer composition according to claim 1, wherein
- a number average molecular weight Mn(A1') of a block chain of a polymer block A1' that has the greatest number average molecular weight among the polymer blocks A1 is from 5,000 to 60,000,
- the number average molecular weight Mn(c) of the polyphenylene ether resin (c) is from 1,000 to 50,000, and Mn(A1')/Mn(c)=1.2-3.0.

13. The thermoplastic elastomer composition according to claim 1, wherein a content of the polypropylene-based resin (b) is from 15 to 50 parts by mass relative to 100 parts by mass of the hydrogenated block copolymer (a).

14. The thermoplastic elastomer composition according to claim 1, wherein an average particle diameter of the polyphenylene ether resin (c) is from 100 to 500 μm.

15. The thermoplastic elastomer composition according to claim 1, which has a hardness of 40 or lower and a compression set of 35% or lower.

16. The thermoplastic elastomer composition according to claim 1, further comprising carbon black (e) and/or an inorganic filler (f) at a quantity of from 3 to 100 parts by mass relative to 100 parts by mass of the hydrogenated block copolymer (a).

17. The thermoplastic elastomer composition according to claim 1, which is partially crosslinked in the presence of an organic peroxide (g).

18. A stopper for a medical container, comprising a sealing material that comprises the thermoplastic elastomer composition according to claim 1.

19. A medical container comprising the stopper for a medical container according to claim 18.

* * * * *